(12) United States Patent
Cooper et al.

(10) Patent No.: US 10,896,388 B2
(45) Date of Patent: Jan. 19, 2021

(54) SYSTEMS AND METHODS FOR BUSINESS ANALYTICS MANAGEMENT AND MODELING

(71) Applicants: Kyler Cooper, Westerville, OH (US); Jessica Emily Dolezal, San Juan Capistrano, CA (US); Andrew Duguay, Columbus, OH (US); Alexander C. Elek, Westerville, OH (US); Danielle Marceau, Columbus, OH (US); Richard Wagner, Columbus, OH (US)

(72) Inventors: Kyler Cooper, Westerville, OH (US); Jessica Emily Dolezal, San Juan Capistrano, CA (US); Andrew Duguay, Columbus, OH (US); Alexander C. Elek, Westerville, OH (US); Danielle Marceau, Columbus, OH (US); Richard Wagner, Columbus, OH (US)

(73) Assignee: PREVEDERE, INC., Columbus, OH (US)

( * ) Notice: Subject to any disclaimer, the term of this patent is extended or adjusted under 35 U.S.C. 154(b) by 0 days.

(21) Appl. No.: 16/221,416

(22) Filed: Dec. 14, 2018

(65) Prior Publication Data

US 2019/0188612 A1 Jun. 20, 2019

Related U.S. Application Data

(63) Continuation-in-part of application No. 13/558,333, filed on Jul. 25, 2012, now Pat. No. 10,176,533, and
(Continued)

(51) Int. Cl.
*G06Q 10/04* (2012.01)
*G06N 20/00* (2019.01)
*G06Q 10/06* (2012.01)

(52) U.S. Cl.
CPC ............ *G06Q 10/04* (2013.01); *G06N 20/00* (2019.01); *G06Q 10/063* (2013.01); *G06Q 10/067* (2013.01)

(58) Field of Classification Search
CPC .............................. G06Q 40/00; G06Q 40/06
(Continued)

(56) References Cited

U.S. PATENT DOCUMENTS

| 5,432,530 A | 7/1995 | Arita et al. |
| 5,454,371 A | 10/1995 | Fenster et al. |

(Continued)

FOREIGN PATENT DOCUMENTS

WO WO2015/183255 12/2015

OTHER PUBLICATIONS

Bruce "Multi-Step Forecast Model Selection", Apr. 2010, JEL Classification, pp. 1-18 (Year: 2010).*
(Continued)

*Primary Examiner* — Romain Jeanty
(74) *Attorney, Agent, or Firm* — Kang S. Lim

(57) ABSTRACT

The present invention relates to systems and methods for model generation. The model is generated by selecting indicators that are relevant to the model, determining a strength score for each of the indicators, ranking the indicators by their strength scores, and bucketizing the indicators. Different permutations of the indicators are then selected for modeling in parallel. The model results are compared, and the 'best' model (most historically accurate) is selected for display within a report.

18 Claims, 21 Drawing Sheets

Related U.S. Application Data a continuation-in-part of application No. 15/154,697, filed on May 13, 2016, now Pat. No. 10,740,772.

(60) Provisional application No. 61/512,405, filed on Jul. 28, 2011, provisional application No. 61/511,527, filed on Jul. 25, 2011, provisional application No. 62/269,978, filed on Dec. 19, 2015, provisional application No. 62/290,441, filed on Feb. 2, 2016.

(58) Field of Classification Search
USPC .................................................... 705/7.29
See application file for complete search history.

(56) References Cited

U.S. PATENT DOCUMENTS

| | | | |
|---|---|---|---|
| 5,475,851 | A | 12/1995 | Kodosky et al. |
| 5,727,161 | A | 3/1998 | Purcell, Jr. |
| 5,793,375 | A | 8/1998 | Tanaka |
| 6,054,984 | A | 4/2000 | Alexander |
| 6,064,984 | A | 5/2000 | Ferguson et al. |
| 6,133,914 | A | 10/2000 | Rogers et al. |
| 6,362,842 | B1 | 3/2002 | Tahara et al. |
| 6,473,084 | B1 | 10/2002 | Phillips et al. |
| 6,549,864 | B1 | 4/2003 | Portyrailo |
| 6,614,456 | B1 | 9/2003 | Rzepkowski et al. |
| 6,757,217 | B2 | 6/2004 | Eastwood et al. |
| 6,801,199 | B1 | 10/2004 | Wallman |
| 6,822,662 | B1 | 11/2004 | Cook et al. |
| 6,901,383 | B1 | 5/2005 | Ricketts et al. |
| 7,072,863 | B1* | 7/2006 | Phillips ................. G06Q 40/00 703/2 |
| 7,134,093 | B2 | 11/2006 | Etgen et al. |
| 7,348,979 | B2 | 3/2008 | Tso |
| 7,363,584 | B1 | 4/2008 | Molesky |
| 7,496,852 | B2 | 2/2009 | Eichorn et al. |
| 7,554,521 | B1 | 6/2009 | Migos et al. |
| 7,698,188 | B2 | 4/2010 | Hollas et al. |
| 7,800,613 | B2 | 9/2010 | Hanrahan et al. |
| 7,818,246 | B2 | 10/2010 | Cushing et al. |
| 7,904,376 | B2 | 3/2011 | Shapiro et al. |
| 7,941,742 | B1 | 5/2011 | Hao et al. |
| 7,991,672 | B2 | 8/2011 | Crowder |
| 7,999,809 | B2 | 8/2011 | Beers et al. |
| 8,019,638 | B1* | 9/2011 | Uhl ..................... G06Q 30/0201 705/7.31 |
| 8,051,000 | B2 | 11/2011 | Kurczek et al. |
| 8,306,847 | B2 | 11/2012 | Sperry |
| 8,315,938 | B1 | 11/2012 | Forsythe |
| 8,346,682 | B2 | 1/2013 | Steed et al. |
| 8,381,090 | B2 | 2/2013 | Bruckner et al. |
| 8,731,983 | B2* | 5/2014 | Gudla .................... G06Q 10/06 705/7.11 |
| 8,732,696 | B2* | 5/2014 | Bukary ................. G06Q 10/00 717/178 |
| 8,843,427 | B1 | 9/2014 | Lin |
| 2003/0126054 | A1 | 7/2003 | Purcell, Jr. |
| 2003/0212618 | A1 | 11/2003 | Keyes et al. |
| 2004/0169638 | A1 | 9/2004 | Kaplan |
| 2005/0021485 | A1 | 1/2005 | Nodelman et al. |
| 2007/0088648 | A1 | 4/2007 | Mather et al. |
| 2007/0156565 | A1 | 7/2007 | Singer et al. |
| 2007/0244741 | A1 | 10/2007 | Blume |
| 2008/0086401 | A1 | 4/2008 | Mather |
| 2008/0133313 | A1 | 6/2008 | Bateni et al. |
| 2008/0147486 | A1 | 6/2008 | Wu |
| 2008/0195930 | A1 | 8/2008 | Tolle |
| 2009/0083120 | A1 | 3/2009 | Strichman |
| 2009/0187606 | A1 | 7/2009 | Allweil et al. |
| 2009/0216684 | A1 | 8/2009 | Helweg |
| 2010/0076819 | A1 | 3/2010 | Wannier |
| 2010/0100469 | A1 | 4/2010 | Buchanan et al. |
| 2010/0138275 | A1 | 6/2010 | Bateni et al. |
| 2010/0185976 | A1 | 7/2010 | Sadanandan |
| 2010/0306031 | A1* | 12/2010 | McCauley ......... G06Q 30/0201 705/7.29 |
| 2011/0007097 | A1 | 2/2011 | Williams |
| 2011/0087985 | A1 | 4/2011 | Buchanan et al. |
| 2011/0107265 | A1 | 5/2011 | Buchanan et al. |
| 2011/0208701 | A1 | 8/2011 | Jackson et al. |
| 2011/0231339 | A1 | 9/2011 | Hansen |
| 2011/0246260 | A1 | 10/2011 | Gilbert |
| 2011/0283188 | A1 | 11/2011 | Farrenkopf et al. |
| 2011/0302112 | A1 | 12/2011 | Shan |
| 2011/0313809 | A1 | 12/2011 | Baek |
| 2012/0016269 | A1 | 1/2012 | Moctezuma de la Barrera |
| 2012/0101912 | A1 | 4/2012 | Sen |
| 2012/0150576 | A1* | 6/2012 | Wagenblatt .......... G06Q 10/063 705/7.12 |
| 2012/0159384 | A1 | 6/2012 | Zyskowski et al. |
| 2012/0188250 | A1 | 7/2012 | Kaplan et al. |
| 2012/0245970 | A1 | 9/2012 | Pulido De Los Reyes et al. |
| 2012/0317506 | A1 | 12/2012 | Zhao et al. |
| 2012/0317509 | A1 | 12/2012 | Ludwig et al. |
| 2013/0024170 | A1 | 1/2013 | Dannecker et al. |
| 2013/0041792 | A1 | 2/2013 | King et al. |
| 2013/0055132 | A1 | 2/2013 | Foslien |
| 2013/0066678 | A1* | 3/2013 | May ................... G06Q 30/0202 705/7.31 |
| 2013/0086521 | A1 | 4/2013 | Grossele et al. |
| 2013/0179130 | A1 | 7/2013 | Zhandov |
| 2013/0179739 | A1 | 7/2013 | Ikegami |
| 2014/0074557 | A1* | 3/2014 | Rallapalli ............ G06Q 10/067 705/7.36 |
| 2014/0129269 | A1* | 5/2014 | Rey .................. G06Q 10/06393 705/7.12 |
| 2014/0149180 | A1* | 5/2014 | Yaseen ............... G06Q 30/0202 705/7.31 |
| 2014/0172654 | A1 | 6/2014 | Wagner |
| 2014/0324537 | A1* | 10/2014 | Gilbert ............. G06Q 10/06375 705/7.31 |
| 2014/0351023 | A1* | 11/2014 | Rallapalli ............ G06Q 10/067 705/7.36 |
| 2015/0134401 | A1* | 5/2015 | Heuer ................ G06Q 30/0202 705/7.29 |
| 2016/0092799 | A1* | 3/2016 | Khan .................... G06Q 10/063 705/7.11 |
| 2016/0110812 | A1* | 4/2016 | Mun ..................... G06Q 40/06 705/36 R |

OTHER PUBLICATIONS

USPTO, ISA/US, "Notification of Transmittal of the ISR and the Written Opinion of the International Searching Authority, or the Declaration," in PCT Application No. PCT/US2016/067026, dated Mar. 27, 2017, 7 pages.
SAS/ETS User's Guide Version 8—vol. 1 SAS, Institute Inc., 1999.
Tableau Software Combination Charts, Tableau Software, Inc., 2010.
Tableau Software Forecasting, Tableau Software, Inc., 2012.
Tableau Visual Guidebook, Tableau Software, Inc., 2010.
MacDonald, MRRHWQ, Excel 2003 for Starters—Chapter 9 Pogue Press, O'Reily, Feb. 9, 2009.
SAS/Graph 9.2 Reference—Second Edition, SAS, 2010.
Jelen, Bill, Rev Up to Excel 2010—Upgraders Guide to Excel 2010; Holy Marco! Books, 2010.
Moyle, Michael et al., A Flick in the Right Direction: A Case Stude of Gestural Input in Behavior and Information Technology, 2005.
Microsoft Excel 2010 Charts and Graphs—Class Workbook UCSD Biomedical Library Workshop, Unknown Date.
Stolte, Chris et al., Polaris: A System for Query, Analysis, and Visualization of Multidimensional Relational Databases IEEE Transactions on Visualization and Computer Graphics, vol. 8, No. 1. Jan.-Mar. 2002.
Cognos 8 Business Intelligence—Report Studio User Guide, Cognos Inc., 2006.
Basic Usage of AS/ETS Software to Forecast a Time Series NESUG16, Statistics, Data Analysis & Econometrics, 2003.

(56) References Cited

OTHER PUBLICATIONS

Cyclical Analysis and Exponential Forecasting Simetar, Simulation & Econometrics to Analyze Risk, 2004.
Lahiri, Kajal, Evaluating Probability Forecasts for GDP Declines 2007.
Springer "Business performance forecasting of convenience store based on enhanced fuzzy neural network", Oct. 2008; Neural Computing and Applications, vol. 17 Issue 5-6, pp. 569-578. (Year:2008).
European Patent Office, EPO Application No. 16876720.0, "Supplementary Extended European Search Report and Opinion", dated May 28, 2019, 7 pages.

\* cited by examiner

SYSTEMS AND METHODS FOR BUSINESS ANALYTICS MANAGEMENT AND MODELING

CROSS REFERENCE TO RELATED APPLICATIONS

The present application also is a continuation-in-part and claims priority to a commonly-owned application entitled "Business Performance Forecasting System and Method", U.S. application Ser. No. 13/558,333, filed on Jul. 25, 2012, recently allowed, which is a non-provisional and claims the benefit of U.S. Provisional Applications No. 61/512,405 filed Jul. 28, 2011 and 61/511,527 filed Jul. 25, 2011.

The present application also is a continuation-in-part and claims priority to a commonly-owned application entitled "Systems and Methods for Forecasting Based upon Time Series Data", application Ser. No. 15/154,697, filed on May 13, 2016, pending, which is a non-provisional and claims the benefit of U.S. Provisional Applications No. 62/269,978 filed Dec. 19, 2015 and 62/290,441 filed Feb. 2, 2016.

All of the above-referenced applications are incorporated herein in their entirety by this reference.

BACKGROUND

The present invention relates to systems and methods for the management and modeling of business analytics. Business analytics allows for improved insight into the current and future state of industries. These metrics are very useful to business decision makers, investors and operations experts.

Many factors influence the success or failure of a business or other organization. Many of these factors include controllable variables, such as product development, talent acquisition and retention, and securing business deals. However, a significant amount of the variables influencing a business' success are external to the organization. These external factors that influence an organization are typically entirely out of control of the organization, and are often poorly understood or accounted for during business planning. Generally, one of the most difficult variables for a business to account for is the general health of a given business sector.

While these external factors are not necessarily able to be altered, being able to incorporate them into business planning allows a business to better understand the impact on the business, and make strategic decisions that take into account these external factors. This may result in improved business performance, investing decisions, and operational efficiency. However, it has traditionally been very difficult to properly account for, or model, these external factors; let alone generate meaningful forecasts using many different factors in a statistically meaningful and user friendly way.

For example, many industry outlooks that current exist are merely opinions of so-called "experts" that may identify one or two factors that impact the industry. While these expert forecasts of industry health have value, they provide a very limited, and often inaccurate, perspective into the industry. Further these forecasts are generally provided in a qualitative format, rather than as a quantitative measure. For example, the housing industry may be considered "healthy" if the prior year demand was strong and the number of housing starts is up. However, the degree of 'health' in the market versus a prior period is not necessarily available or well defined.

As a result, current analytical methods are incomplete, not quantitative, time consuming and labor intensive processes that are inadequate for the today's competitive, complex and constantly evolving business landscape.

It is therefore apparent that an urgent need exists for organizational solutions that enable the management and modeling of business analytics. These systems and methods for modeling and managing business analytics enables better organizational and investment functioning.

SUMMARY

To achieve the foregoing and in accordance with the present invention, systems and methods for modeling and management of business analytics are provided. Such systems and methods enable business persons, investors, and industry strategists to better understand the present state of their industries, and more importantly, to have foresight into the future state of their industry.

In some embodiments, a model is generated by a business analytics system. The model is generated by selecting indicators that are relevant to the model, determining a strength score for each of the indicators, ranking the indicators by their strength scores, and bucketizing the indicators. Different permutations of the indicators are then selected for modeling in parallel. The model results are compared, and the 'best' model (most historically accurate) is selected for display within a report.

The indicators are determined to be relevant by tags associated with them, which may be searched and selected for inclusion by the user. The strength score for an indicator uses a number of factors, including a R-square calculation, a procyclic calculation, a minor outlier count, a major outlier count, a seasonality determination, data overlap, difference in last updated data number of periods, number of models the indicator is included in, total number of models, and frequency value of the indicator.

The indicators after strength scoring and ranking are divided into one of four buckets. These include a macroeconomic bucket, a target industry bucket, a demand industry bucket and a miscellaneous bucket. Even numbers are included into each bucket. The data sets in the macroeconomic bucket are all at a national level, but the datasets in the target industry bucket, the demand industry bucket and the miscellaneous bucket are equal parts national level and local level datasets if appropriate. When a local level dataset is unavailable or inappropriate, a higher level dataset (such as country or regional) is substituted. Bucket selection is based upon indicator tags and strength scores.

After a model has been generated it may be backtested, edited, and have various factors such as accuracy measures generated for it. This type of data may all be incorporated into the report that is based upon report templates.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1A:
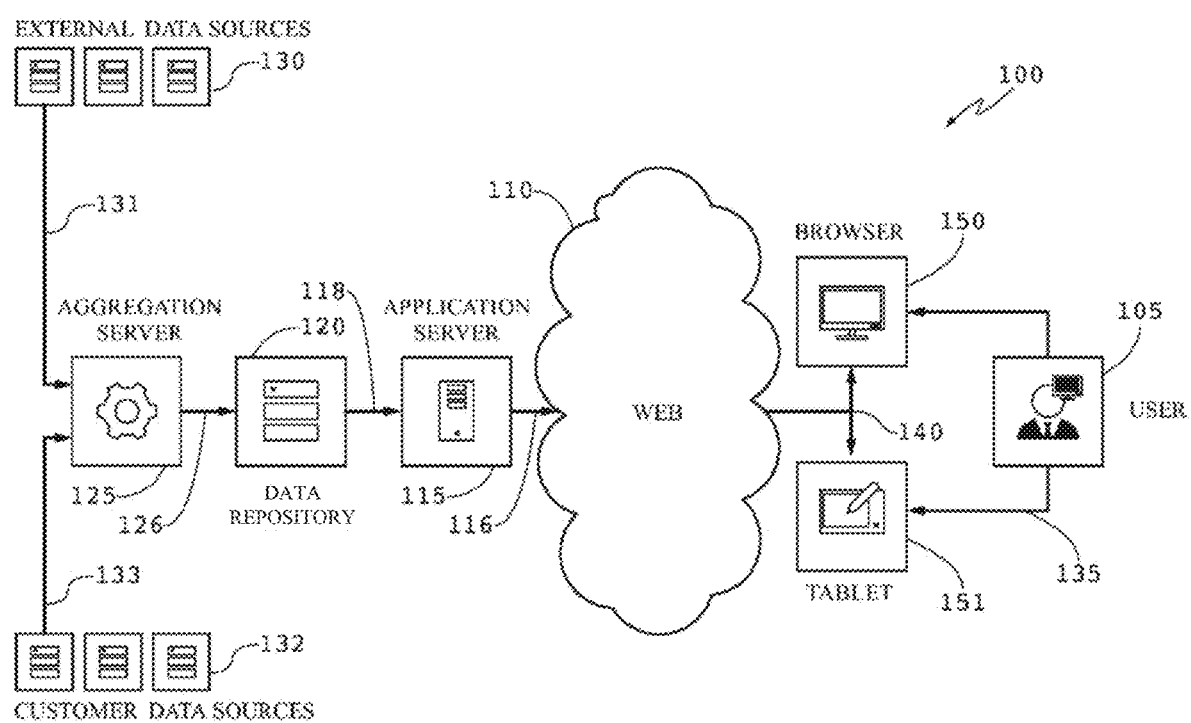
FIG. 1A is an example logical diagram of a data management system for business analytics management and modeling, in accordance with some embodiments.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only.

All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "only," "first," "initially," "next," "subsequently," "before," "after," "lastly," and "finally," are not meant to limit the scope of the present invention as the embodiments disclosed herein are merely exemplary.

Note that significant portions of this disclosure will focus on the management and modeling of data for businesses. While this is intended as a common use case, it should be understood that the presently disclosed systems and methods are useful for the modeling and management of data based upon any time series data sets, for consumption by any kind of user. For example, the presently disclosed systems and methods could be relied upon by a researcher to predict trends as easily as it is used by a business to forecast sales trends. As such, any time the term 'business' is used in the context of this disclosure it should be understood that this may extend to any organization type: individual, investor group, business entity, governmental group, non-profit, religious affiliation, research institution, and the like. Further, references to business analytics, or business models should be understood to not be limited to commerce, but rather to any situation where such analysis may be needed or desired.

Lastly, note that the following description will be provided in a series of subsections for clarification purposes. These following subsections are not intended to artificially limit the scope of the disclosure, and as such any portion of one section should be understood to apply, if desired, to another section.

I. Data Management Systems for Modeling Business Analytics

The present invention relates to systems and methods for using available data and metrics to generate an entirely new data set through transformations to yield models. While various indices are already known, the presently disclosed systems and methods provide the ability to generate highly accurate models that are forward looking rather than providing merely a snapshot of the current situation. Such systems and methods allow for superior insight into current and near future health and activity of a given industry sector, product, company or other dimension of interest. This enables for better business planning, preparation, investment, and generally may assist in influencing behaviors in more profitable ways.

To facilitate discussion, FIG. 1A is an example logical diagram of a data management system for business analytics modeling 100. The data analysis system 100 connects a given analyst user 105 through a network 110 to the system application server 115. A database/data repository 120 (or other suitable dataset based upon forecast sought) is linked to the system application server via connection 121 and the database 120 thus provides access to the data necessary for utilization by the application server 115.

The database 120 is populated with data delivered by and through the data aggregation server 125 via connection 126. Data aggregation server 125 is configured to have access to a number of data sources, for instance external data sources 130 through connection 131. The data aggregation server can also be configured to have access to proprietary or internal data sources, e.g. customer data sources, 132, through connection 133. The aggregated data may be stored in a relational database (RDBM) or in big data-related storage facilities (e.g., Hadoop, NoSQL), with its formatting pre-processed to some degree (if desired) to conform to the data format requirement of the analysis component.

Network 110 provides access to the user or data analyst (the user analyst). User analyst 105 will typically access the system through an internet browser, such as Chrome or Mozilla Firefox, or a standalone application, such as an app on tablet 151. As such the user analyst (as shown by arrow 135) may use an internet connected device such as browser terminal 150, whether a personal computer, mainframe computer, or VT100 emulating terminal. Alternatively, mobile devices such as a tablet computer 151, smart telephone, or wirelessly connected laptop, whether operated over the internet or other digital telecommunications networks, such as a 4G network. In any implementation, a data connection 140 is established between the terminal (e.g. 150 or 151) through network 110 to the application server 115 through connection 116.

Network 110 is depicted as a network cloud and as such is representative of a wide variety of telecommunications networks, for instance the world wide web, the internet, secure data networks, such as those provided by financial institutions or government entities such as the Department of Treasury or Department of Commerce, internal networks such as local Ethernet networks or intranets, direct connections by fiber optic networks, analog telephone networks, through satellite transmission, or through any combination thereof.

The database 120 serves as an online available database repository for collected data including such data as internal metrics. Internal metrics can be comprised of, for instance, company financial data of a company or other entity, or data derived from proprietary subscription sources. Economic, demographic, and statistical data that are collected from various sources and stored in a relational database, hosted and maintained by a data analytics provider and made accessible via the internet. The data analytics provider may also arrange for a mirror of the datasets to be available at the company's local IT infrastructure or within a company intranet, which is periodically updated as required.

The application server 115 provides access to a system that provides a set of calculations based on system formula used to calculate the leading, lagging, coincident, procyclic, acyclic, and counter-cyclic nature of economic, demographic, or statistical data compared to internal metrics, e.g., company financial results, or other external metrics. The system also provides for formula that may be used to calculate a plurality of models based on projected or actual economic, demographic, and statistical data and company financial or sold volume or quantity data. Details of the formulas and processes utilized for the calculation of these models shall be provided in further detail below. These calculations can be displayed by the system in chart or other graphical format.

In some embodiments, changes observed in a metric may also be classified according to its direction of change relative to the indicator that it is being measured against. When the metric changes in the same direction as the indicator, the relationship is said to be 'procyclic'. When the change is in the opposite direction as the indicator, the relationship is said to be 'countercyclic'. Because it is rare that any two metrics will be fully procyclic or countercyclic, it is also possible that a metric and an indicator can be acyclic—e.g., the metric exhibits both procyclic and countercyclic movement with respect to the indicator.

The application residing on server 115 is provided access to interact with the customer datasource(s) 132 through the database 120 to perform automatic calculations which identify leading, lagging, and coincident indicators as well as the procyclic, acyclic, and counter-cyclic relationships between customer data and the available economic, demographic, and statistical data. Additionally, the models may be automatically populated on a periodic schedule, e.g. every month. Users 105 of the software applications that can be made available on the application server 115 are able to select and view charts or monitor dashboard modules displaying the results of the calculations performed by the system. In some embodiments, user 105 can select data in the customer repository for use in the calculations that may allow the user to forecast future performance, or tune the business analytics models. The types of indicators and internal data are discussed in more detail in connection with the discourse accompanying the following figures. Alternatively, users can view external economic, demographic, and statistical data only and do not have to interface with internal results, at the option of the user. In yet other embodiments, all internal and external data may be shielded from the user, and only the models and analytics are provided to the user for ease of use.

Data is collected for external indicators and internal metrics of a company through the data aggregation server 125. The formulas built into the application identify relationships between the data. Users 105 can then use the charting components to view the results of the calculations and models. In some embodiments, the data can be entered into the database 120 manually, as opposed to utilizing the data aggregation server 125 and interface for calculation and forecasting. In some embodiments, the users 105 can enter and view any type of data and use the applications to view charts and graphs of the data.

Figure 1B:
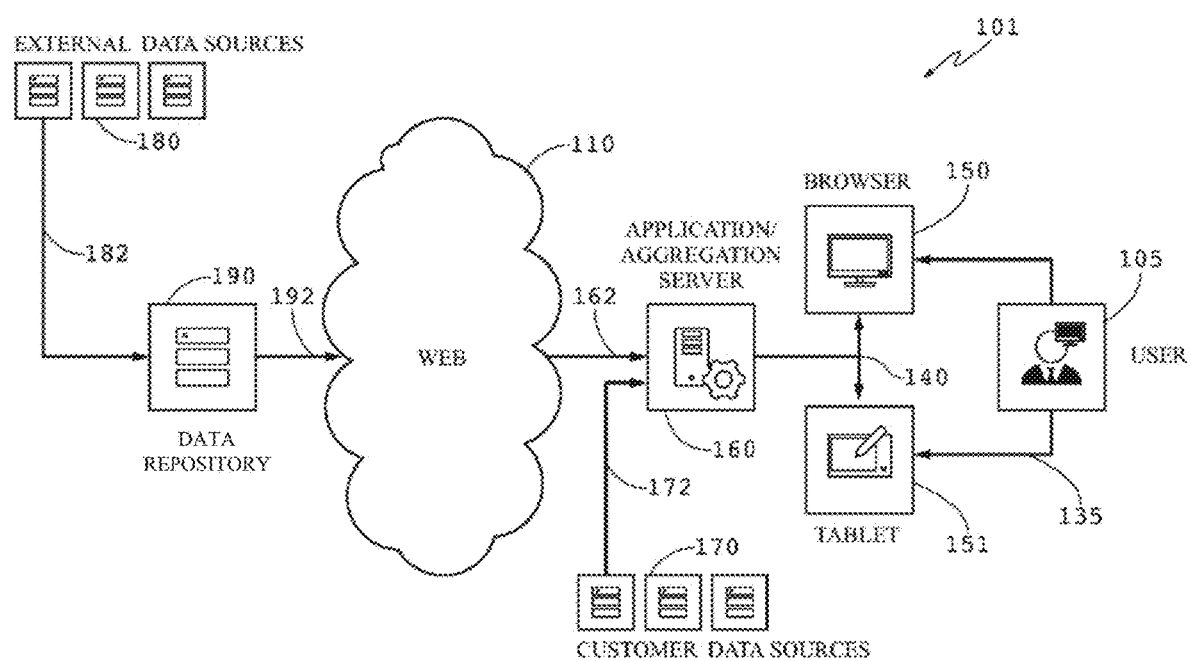
FIG. 1B is a second example logical diagram of a data management system for business analytics management and modeling, in accordance with some embodiments.

Alternatively, in some system users may have sensitive data that requires it to be maintained within the corporate environment. FIG. 1B depicts components of the system in an exemplary configuration to achieve enhanced data security and internal accessibility while maintaining the usefulness of the system and methods disclosed herein. For example, the data management system 101 may be configured in such a manner so that the application and aggregation server functions described in connection with FIG. 1A are provided by one or more internal application/aggregation servers 160. The internal server 160 access external data sources 180 through metrics database 190, which may have its own aggregation implementation as well. The internal server accesses the metrics database 190 through the web or other such network 110 via connections 162 and 192. The metrics database 190 acquires the appropriate data sets from one or more external sources, as at 180, through connection 182.

The one or more customer data sources 170 may be continue to be housed internally and securely within the internal network. The internal server 160 access the various internal sources 170 via connection 172, and implements the same type of aggregation techniques described above. The user 105 of the system then accesses the application server 160 with a tablet 151 or other browser software 150 via connections 135 and 140, as in FIG. 1A. External data sources 130 and 180 may be commercial data subscriptions, public data sources, or data entered into an accessible form manually.

Figure 2:
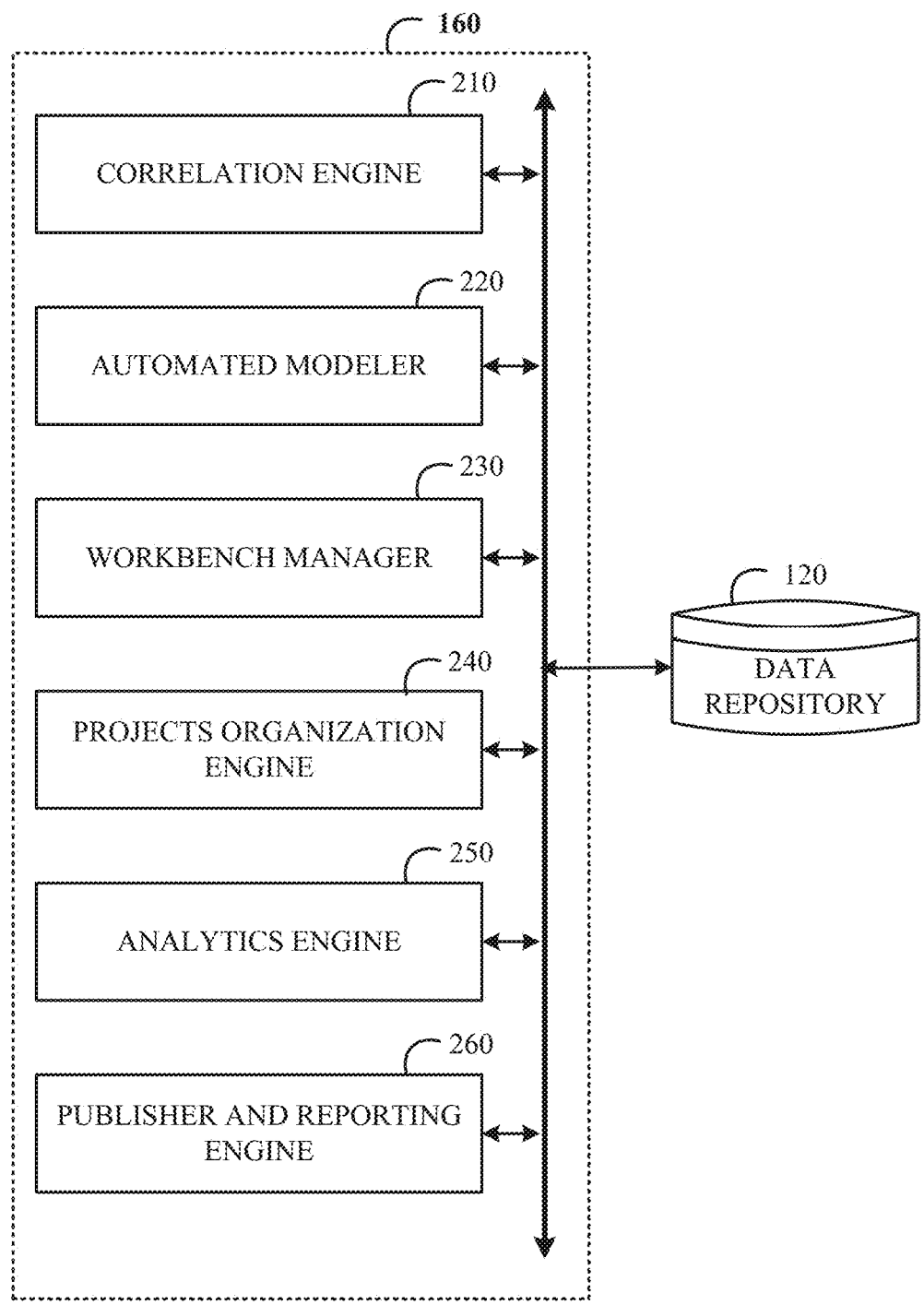
FIG. 2 is an example logical diagram of an application server, in accordance with some embodiments.

FIG. 2 is an example logical diagram of an application server 160 that includes various subcomponents that act in concert to enable a number of functions, including the generation of project dashboards and business analytics models. Generally the data being leveraged for the generation of models includes economic, demographic, geopolitical, public record and statistical data. In some embodiments, the system utilizes any time series dataset. This time series data stored in the metrics database 120, is available to all subsystems of the application server 160 for manipulation, transformation, aggregation, and analysis.

The subcomponents of the application server 160 are illustrated as unique modules within the server coupled by a common bus. While this embodiment is useful for clarification purposes, it should be understood that the presently discussed application server may consist of logical subcomponents operating within a single or distributed computing architecture, may include individual and dedicated hardware for each of the enumerated subcomponents, may include hard coded firmware devices within a server architecture, or any permutation of the embodiments described above. Further, it should be understood that the listed subcomponents are not an exhaustive listing of the functionality of the application server 160, and as such more or fewer than the listed subcomponents could exist in any given embodiment of the application server when deployed.

The application server 160 includes a correlation engine 210 which generates initial information regarding the metrics that are utilized for the generation of models. For example, the degree of procyclic or counter-cyclic relationship that the indicator expresses may be determined by the correlation engine 210. Additionally, the correlation engine 210 may determine factors such as the number of major and minor outliers for the given index, seasonality level of the indicator, degree of data overlap between the indicator and other indicators, difference of an indicator in terms of number of periods in the last update, the number of models already leveraging the indicator and frequency of the indicator, for example.

The application server 160 also includes a modeler 220. The modeler's 220 functionality shall be discussed in considerable detail below; however, at its root it allows for the advanced compilation of many indicators (including other published composite metrics and forecasts) and enables unique manipulation of these datasets in order to generate models from any time series datasets. Some of the manipulations enabled by the modeler 220 are the ability to visualize, on the fly, the $R^2$, procyclic and countercyclic values for each indicator compared to the model, and may also allow for the locking of any indicators time domain, and to shift other indicators and automatically update statistical measures. Additionally, the modeler 220 may provide the user suggestions of suitable indicators, and manipulations to indicators to ensure a 'best' fit between prior actuals and the forecast over the same time period. The 'best' fit may include a localized maxima optimization of weighted statistical measures. For example, the $R^2$, procyclic and countercyclic values could each be assigned a multiplier and the time domain offset used for any given indicator could be optimized for accordingly. The multipliers/weights could, in some embodiments, be user defined.

Figure 3:
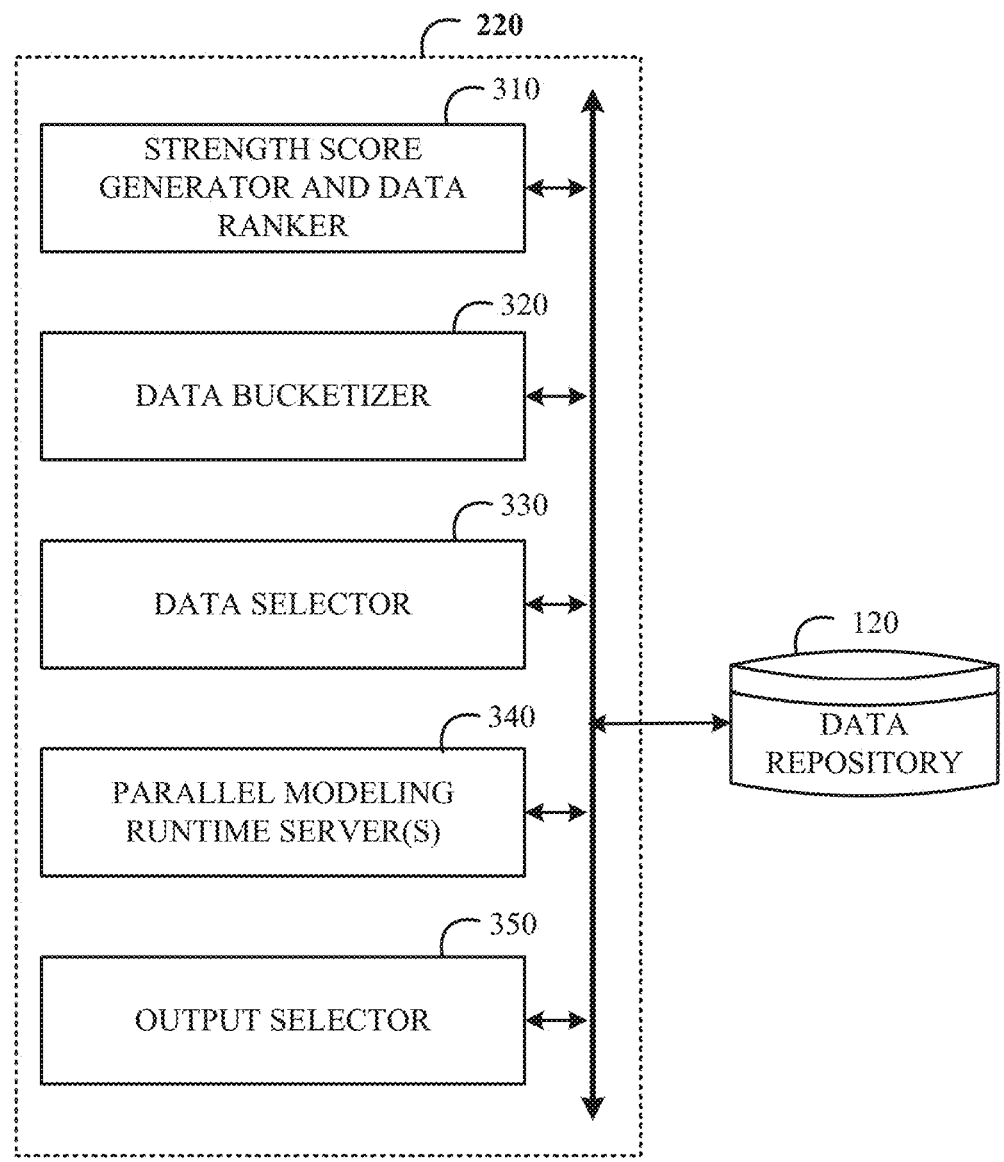
FIG. 3 is an example logical diagram of an automated modeler, in accordance with some embodiments.

FIG. 3 provides a greater detailed illustration of the modeler 220. Critical to the modeling is the determination of which indicators are to be utilized in a given model. A 'strength score' may be calculated for each indicator to assist in this determination. The strength score generator and data ranker 310 consumes the indicator data, along with metrics compiled by the correlation engine 210, to generate the strength score for a given indicator. The indicators are then ranked by their strength indicators.

As noted, an R-squared value for each indicator can be calculated. R-squared calculation is known, and involves the degree of variance in the dependent variable (the modeled variable) that is predicted from the independent variable (here the indicator). For example, the R-squared value may be calculated by first computing the mean of observable data ($\bar{y}$):

$$\bar{y} = \frac{1}{n} \sum_{i=1}^{n} y_i$$

The total sum of squares is calculated:

$$SS_{tot} = \sum_i (y_i - \bar{y})^2$$

The regression sum of squares is next computed using predicted values (f):

$$SS_{reg} = \sum_i (f_i - \bar{y})^2$$

The sum of the squares of the residuals is then calculated:

$$SS_{res} = \sum_i (y_i - f_i)^2 = \sum_i e_i^2$$

Lastly the coefficient of determination (R-squared) is calculated:

$$R^2 = 1 - \frac{SS_{res}}{SS_{tot}}$$

The R-squares value for any given indicator will vary based upon the variable it is being used to model. In addition to the R-squared value, the degree of procyclic relationship between the indicator and the model is received from the correlation engine 210. Also, as noted, the number of minor and major outliers for the indicator are computed. Additionally, the correlation engine will note if an indicator exhibits seasonalily. If it does, then that indicator receives a value of 0.95, whereas a non-seasonal indicator is assigned a value of 1.05. Data overlap between the primary indicator (aka dependent variable) and each of the (explanatory) indicators is provided. The overlap is the number of data points that is shared between the two.

The difference in the last updated date, as a number of periods, the number of models the indicator is used in, the total number of models, and the frequency of the indicator is also received. In some embodiments, the frequency is one of monthly, quarterly, semiannual, or annual. These frequencies are assigned values of 54, 18, 9 or 5, respectively.

In some embodiments, the strength score is determined by first adding together the R-squared and procyclic values. A frequency of use factor is calculated as the number of models the indicator is used in divided by the total number of models, and the result added to one. A last update factor is calculated as the last updated date minus two the result divided by twenty, and the result then subtracted from one. An outlier factor is computed as one minus the number of minor outliers divided by one hundred, the result then minus the number of major outliers divided by twenty. A minimum length factor is lastly calculated as the data overlap divided by the frequency value.

The summed R-squared and procyclic value is multiplied the seasonality factor, the frequency of use factor, the last update factor, the outlier factor, the minimum length factor and one hundred to generate the strength score. For example, assume an indicator has the following values:

| | |
|---|---|
| R-squared | 0.5593 |
| Procyclic | 0.6032 |
| Minor Outlier count | 3 |
| Major Outlier count | 1 |
| Seasonality | No (1.05) |
| Difference in last updated date | 2 |
| Number of models using the index | 50 |
| Total number of models | 500 |
| Frequency | Monthly (54) |

This example indicator's strength score would then be calculated as the following:

| | | |
|---|---|---|
| R-Squared + Procyclic | 0.5593 + 0.6032 | 0.34 |
| Seasonality Factor | 1.05 | 1.05 |
| Frequency of use factor | 1 + (50/500) | 1.1 |
| Last updated Factor | $1 - \frac{(2-2)}{20}$ | 1 |
| Outliers Factor | $1 - \frac{3}{100} - \frac{1}{20}$ | 0.92 |
| Minimum Length Factor | $\frac{64}{54}$ | 1.19 |
| Strength Score | 0.34 × 1.5 × 1.1 × 1 × 0.92 × 1.19 × 100 | 61 |

The indicators are ranked in order from the highest strength score to the lowest strength score. They are then assigned to one of four 'buckets' to be utilized in model generation by a data bucketizer 320. These buckets include macroeconomic datasets, datasets applicable to the specific industry, datasets applicable to the demand industry, and miscellaneous datasets. Besides the macroeconomic bucket, the datasets in each bucket ideally have local (state level) data as well as country level datasets. When local data is unavailable, country level data may be substituted for. The datasets populating each of the buckets may be selected based upon their strength scores and their applicable tags. For example, if the demand industry bucket is for steel, only datasets tagged for steel would be used to populate the bucket.

A mix of country level and local/state level datasets are selected from each of the buckets based upon ranks by a data selector 330. From the selected datasets, various permutations of the data are each run through one or more modeling algorithms by parallel modeling runtime servers 340, to yield multiple model results. These models are then compared to one another, and the best model is selected for output and display by the output selector 350. Models are compared by calculating a weighted average based on the length of segment within the model and the associated R2. The model with the highest overall average is deemed the best.

Returning to FIG. 2, the application server 160 also includes a workbench manager 230 for the consolidated display of projects, data related to the projects and associated models. The workbench manager 230 keeps track of user access controls, recent activity and data updates. This information may be compiled and displayed to the user in an easily understood interface.

The application server 160 also includes an access controller (not illustrated) to protect various data from improper access. Even within an organization, it may be desirable for various employees or agents to have split access to various sensitive data sources, forecasts or models. Further, within a service or consulting organization, it is very important to separate various clients' data, and role access control enables this data from being improperly comingled. A projects organization engine 240 may include the access controller, or work in concert with it, in order to provide a consolidated interface where the projects associated with the user are displayed.

An analytics engine 250 may take the output from the modeler 220, and any additional data, and provide analytical analysis of the results. For example, models may be back-tested, where the as-of dates may be altered and the resulting forecast is compared against actuals. Contribution information, accuracy measures, and definitions are all provided by the analytics engine 250. This component also allows the users to interact with and edit any model they have access to, and add annotations to the model results. All this information may be compiled in a configurable manner into one or more reports.

Lastly, a publisher 260 allows for the reports generated by the analytics engine 250, and/or specific models generated via the modeler 220 to be published, with appropriate access controls, for visualization and manipulation by the users or other intended audiences.

By automating an otherwise time-consuming and labor-intensive process, the above-described data management system for generating models offers many advantages, including the generation of highly relevant and accurate models that are forward looking, and the ability to directly compare the models to historical actual data. In addition, the application server no longer requires user expertise. The result is substantially reduced user effort needed for the generation of timely and accurate business analytics reports.

Now that the systems for data management for generating models have been described in considerable detail, attention will be turned towards methods of operation in the following subsection.

II. Data Management and Modeling Methods

Figure 4:
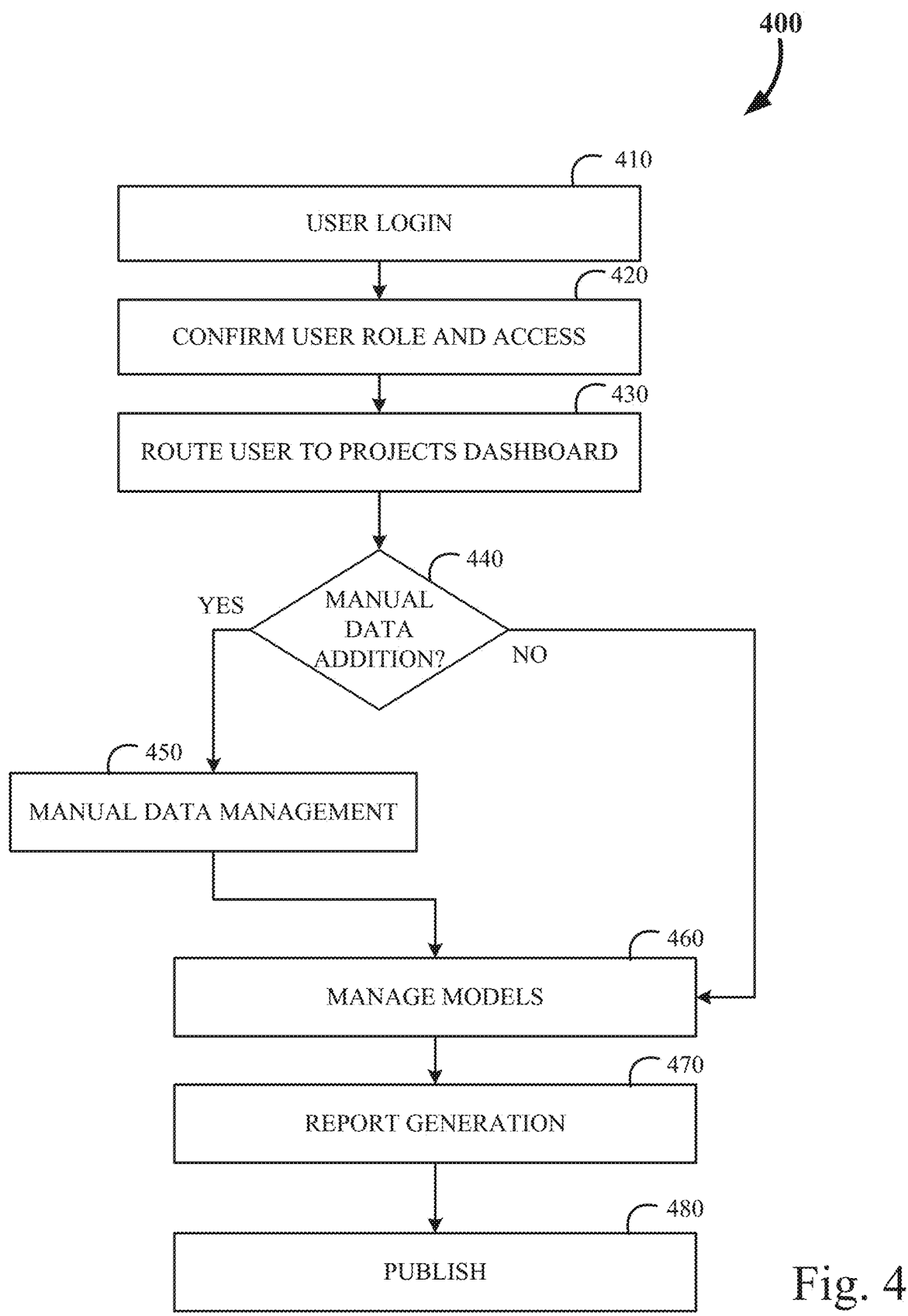
FIG. 4 is a flow chart diagram of an example high level process for business analytics management, in accordance with some embodiments.

To facilitate the discussion, a series of flowcharts are provided. FIG. 4 is a flow chart diagram of an example high level process 400 for data management and business analytics reporting. In this example process, the user of the system initially logs in (at 410) using a user name and password combination, biometric identifier, physical or software key, or other suitable method for accessing the system with a defined user account. The user account enables proper access control to datasets to ensure that data is protected within an organization and between organizations.

Figure 9:
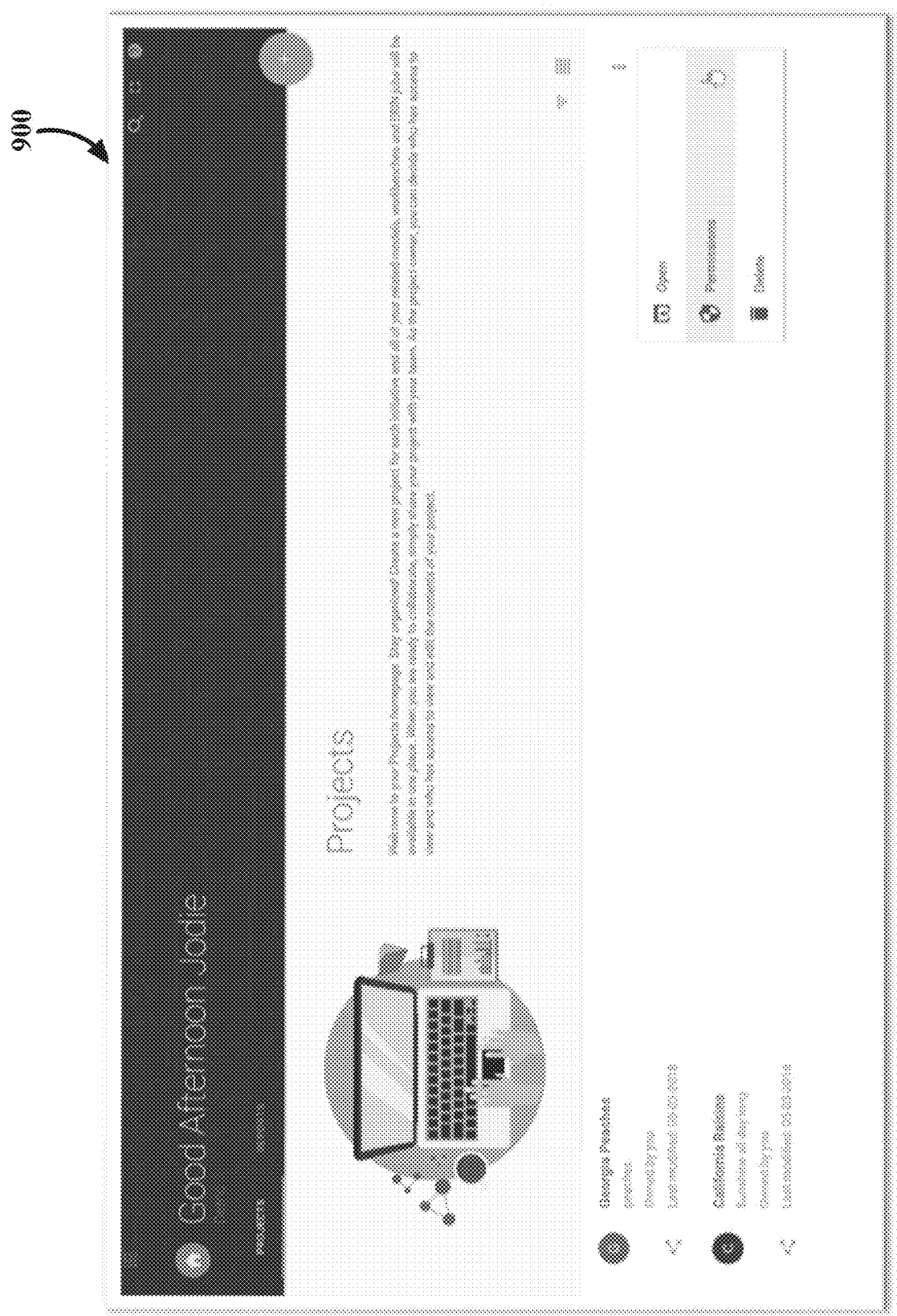
FIG. 9 is an example screenshot illustrating a business analytics management splash page, in accordance with some embodiments.

The user role access is confirmed (at 420) and the user is able to search and manipulate appropriate datasets. This allows the user to access project dashboards (at 430) for enhanced analysis of a given project. An example of a project splashpage 900 is provided in relation to FIG. 9, which a user may be routed to after login. In this splashpage the user is identified/greeted. Only projects the user is authorized to access are provided on the left hand side of this example splashpage. Permissions for sharing projects is also enabled from this screen, as well as the creation or deletion of projects. For the purposes of this discussion a "project" requires permissions to access either view only or editing permission). Data and reports are project agnostic, and therefore may be accessed without attendant permissions.

Figure 10:
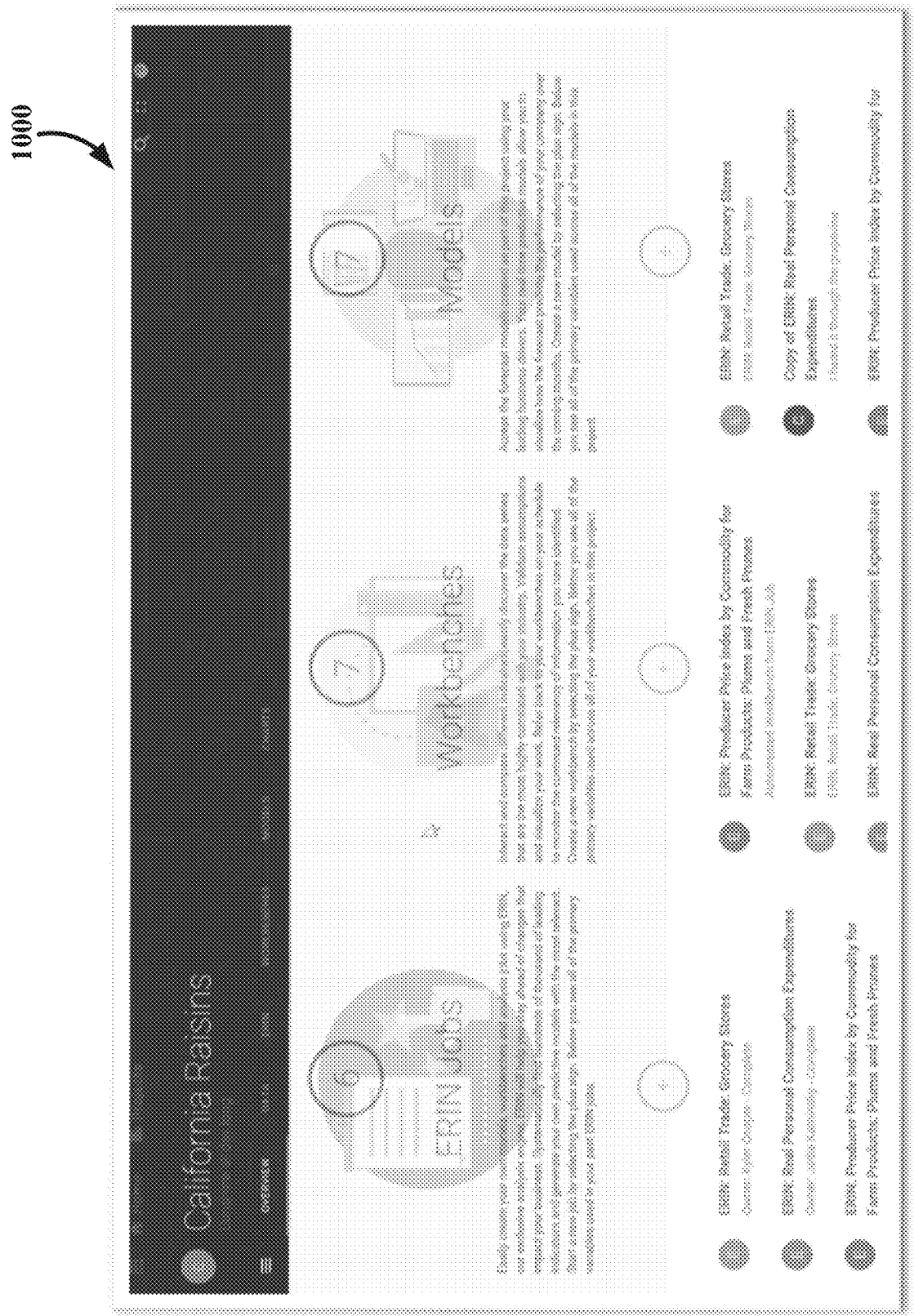
FIG. 10 is an example screenshot illustrating a business analytics management dashboard for a given project, in accordance with some embodiments.

Moving to FIG. 10, a specific project the 'California Raisins' has been selected from the splashpage and opens a project specific page 1000. Again access and permissions may be adjusted on this project page, as well as the initiation of individual tasks such as model, workbench and analytics generation (shown as the tradename 'ERIN'). Additionally individual workbench data manipulations and modeling jobs may be accessed on this screen. The number of each activity for the given project is also displayed, allowing the user to rapidly know the state of the attendant project. For instance, in this example project there are six ERIN jobs, seven workbenches and seven models. The most recently accessed jobs are also displayed to the user to allow for rapid access to where they may have last left off.

Figure 5:
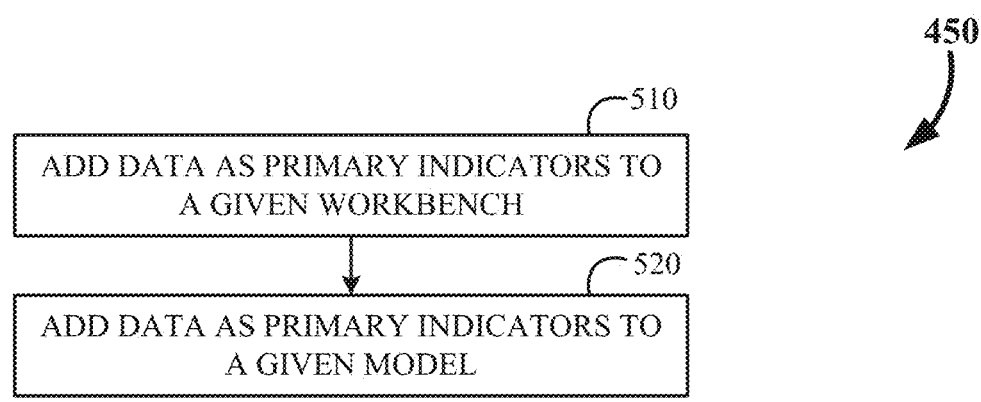
FIG. 5 is a flow chart diagram of manual data management, in accordance with some embodiments.

Returning to FIG. 4, after the projects dashboards have been accessed the user may decide to manage the data manually or via automated indicator scoring (at 440). FIG. 5 provides a flow diagram of manual data management/selection process 450 in greater detail. Data is added as a primary indicator to a given workbench (at 510), and may additionally be added as a primary indicator to a given model (at 520). Data is determined to be a primary indicator by user. Selection of the primary indicator may employ the user searching for a specific dataset using a keyword search and/or using predefined metadata tags. The matching datasets are presented to the user for selection. The search results are ordered by best match to the keyword and/or tags as well as by alternate metrics, such as popularity of a given indicator (used in many other forecast models), quality of indicator data, or frequency of indicator data being updated. Search results may further be sorted and filtered by certain characteristics of the data series, for instance, by region, industry, category, attribute, or the like. In some cases, search display may depend upon a weighted algorithm of any combination of the above factors. In addition to utilizing all or some of the above factors for displaying search results, some embodiments of the method may generate suggestions for indicators to the user independent of the search feature. Likewise, when a user selects an indicator, the system may be able to provide alternate recommendations of 'better' indicators based on any of the above factors.

Figure 11:
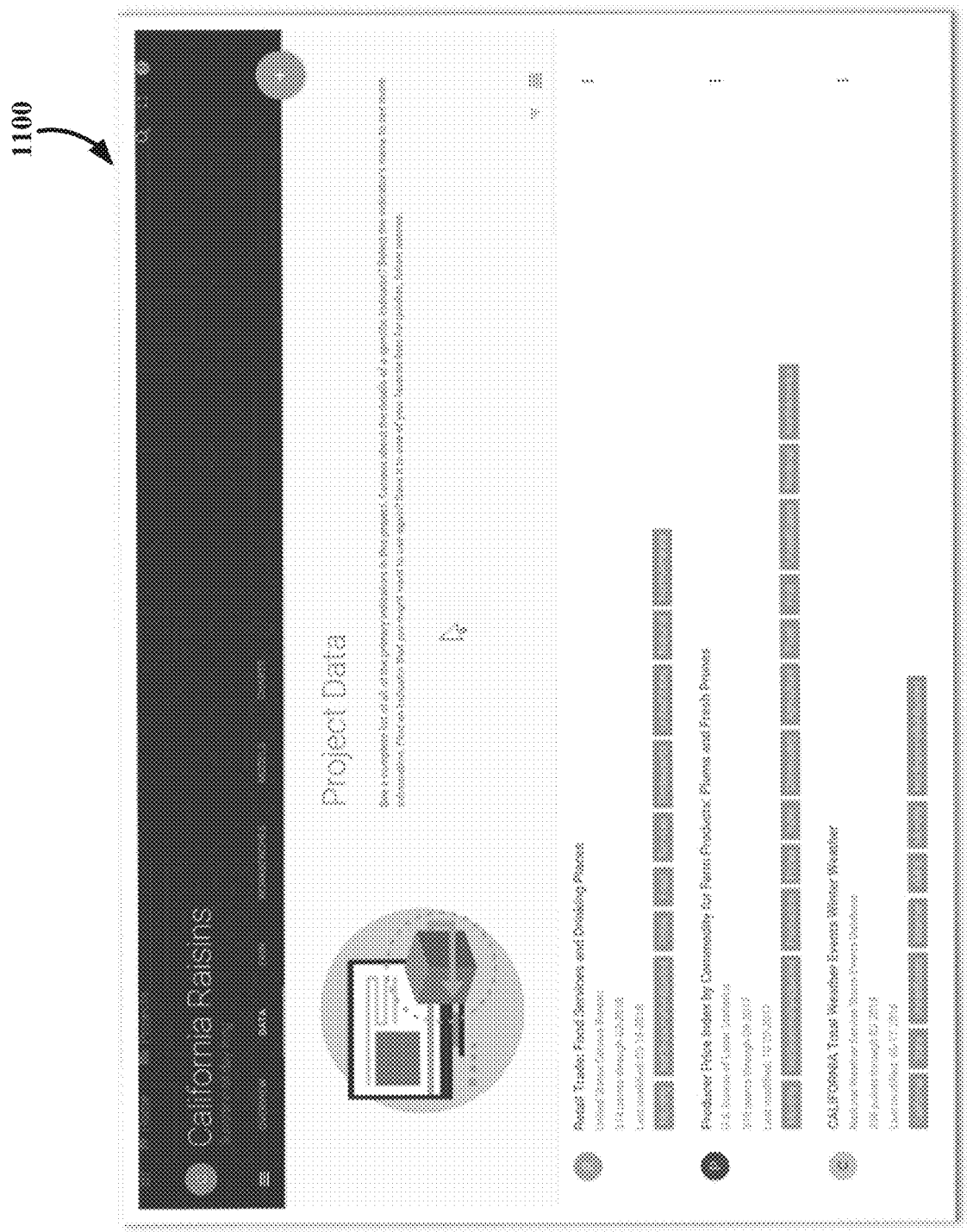
FIG. 11 is an example screenshot illustrating a data management dashboard, in accordance with some embodiments.

FIG. 11 provides an example screenshot of a dashboard 1100 for project data. This dashboard provides data that has been loaded into the project, and any primary indicators associated with the project. The user is able to add data to the project, and assign any data as primary to either a workbench and/or a model associated with the project. For example, in this example illustration, California weather events is shown as a data indicator that may be employed. The last modification date, number of data points in the indicator, source and associated tags are each displayed.

Figure 6:
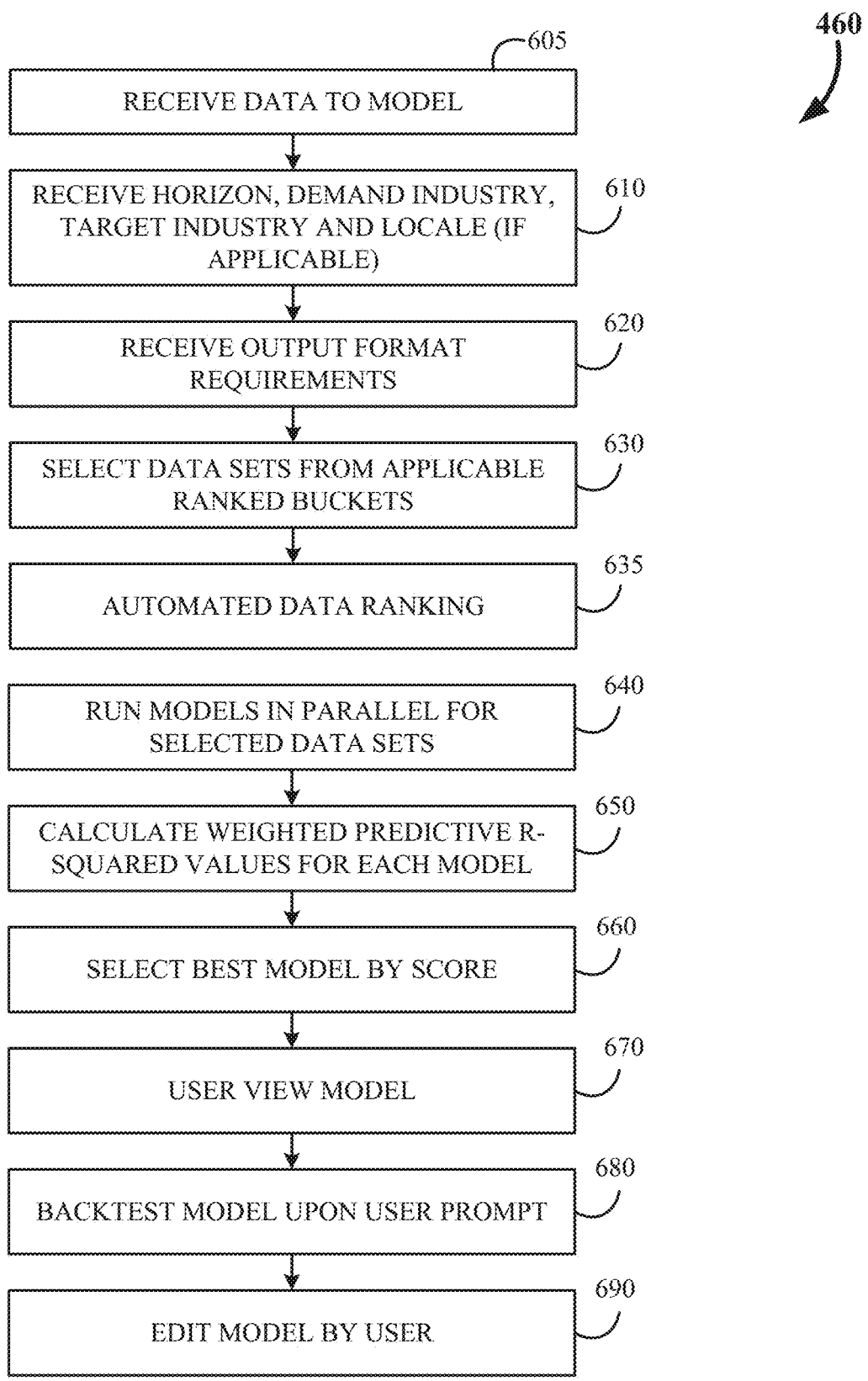
FIG. 6 is a flow chart diagram of automated model creation, in accordance with some embodiments.
Figure 7A:
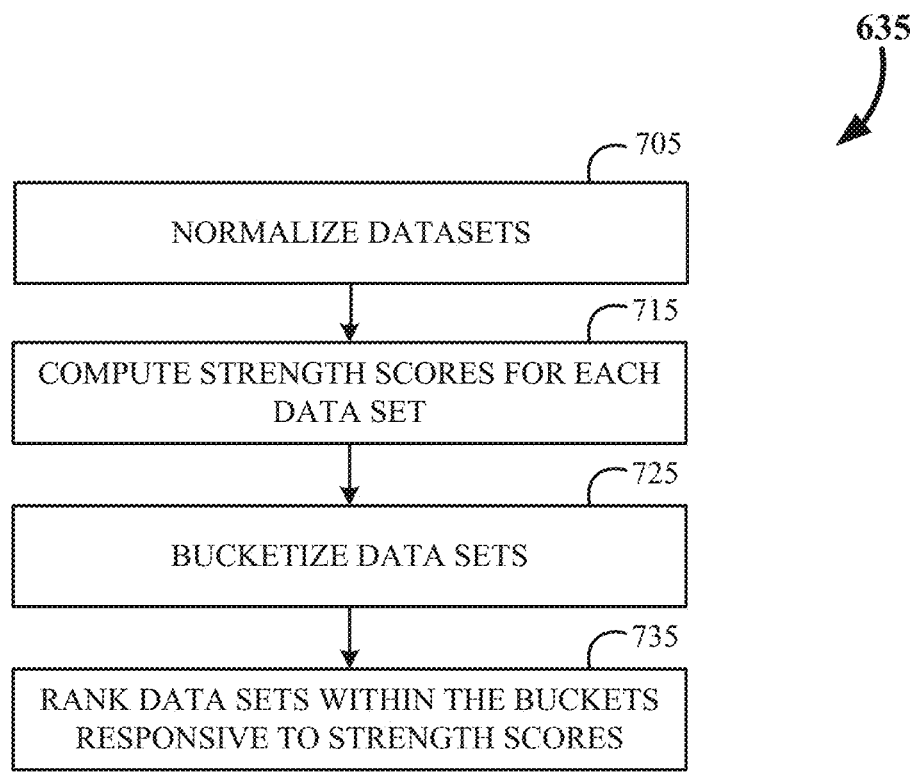
FIG. 7A is a flow chart diagram of automated data scoring, in accordance with some embodiments.

Returning to FIG. 4, after data has been manually managed (or if automatic management is desired) the models may be managed (at 460) using the data that has been identified and organized. FIG. 6 provides greater detail into this model management process. Initially, data is received for the model (at 605). The model horizon (length of model), demand industry, target industry and locale are all received (at 610), which correspond to the bucketized datasets already identified. The output format requirements are also received (at 620). The datasets from the applicable buckets (already identified in the prior process) are selected (at 630), and the data may be automatically scored (at 635). FIG. 7A provides greater detail of this automated process for scoring indicators for automated selection. In this process, the datasets are normalized (at 705). This may include transforming all the datasets into a percent change over a given time period, an absolute dollar amount over a defined time period, or the like. Likewise, periods of time may also be normalized, such that the analysis window for all factors is equal.

The next step for the automated score generation is the computation of a strength score (at 715) as discussed previously in considerable detail. As noted before, strength scores are dependent upon R-squared, procyclic calculation and a number of additional factors such as numbers of outliers, numbers of models, frequency of updates, etc. These factors are used to calculate metrics (e.g., seasonality factor, frequency of use factor, etc.) which are then multiplied together to generate a final score.

Figure 12:
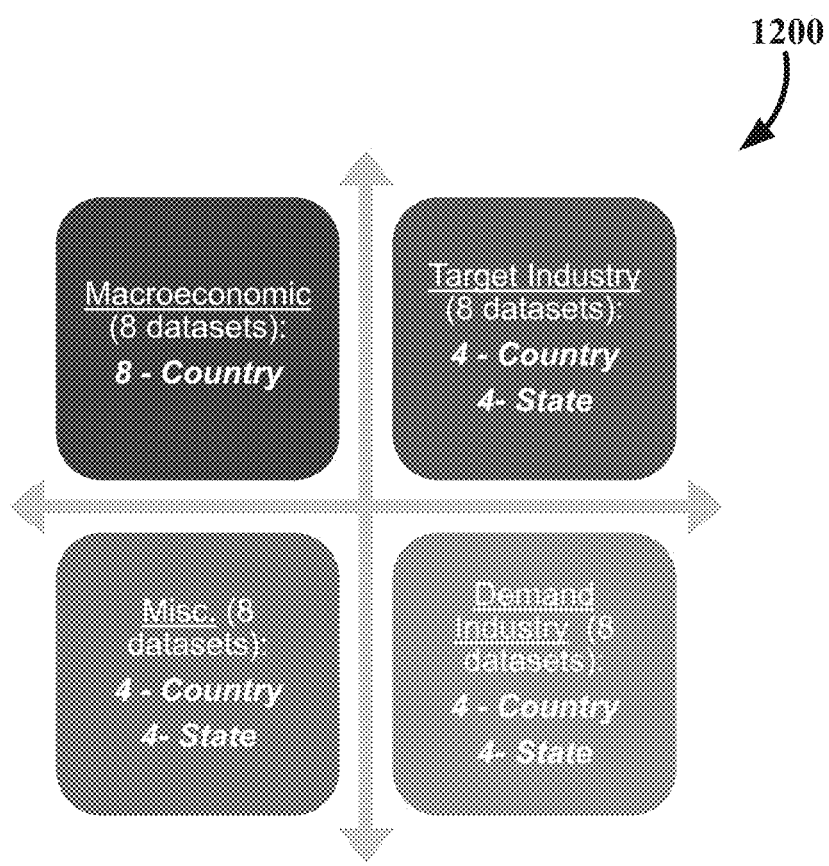
FIG. 12 is an example illustration of data buckets for the automated modeling engine, in accordance with some embodiments.

The various indicators are then bucketized into one of four buckets (at 725). The historical length of the dataset that matches the geographic location that is being modeled for is divided by five and then multiplied by the number of buckets (four) to generate the number of datasets per bucket. The process helps to ensure that the model has an appropriate number of indicators and an even mix of statistically significant economic, industry-specific and geography-specific indicators. For example, if there was available 40 months of dataset information this would be divided by 5 and multiplied by four to generate 32, the number of datasets for this model. This results in 8 datasets available for each bucket. The datasets in each bucket may then be ranked by their strength scores (at 735). FIG. 12 provides an example illustration 1200 of the four buckets. These include a macroeconomic bucket having 8 national datasets (for this specific example). The second bucket is the target industry, which is divided into 4 national datasets and 4 local (i.e., state level) datasets. When available, alternate definitions of locality may be employed, when sufficiently granular indicators are available. For example, in some embodiments, the buckets may include state and county level datasets, or even city level datasets. Likewise, the demand industry bucket and miscellaneous bucket include combinations of local and national datasets. When local data is not available for any given dataset, it may be possible to substitute a higher level data set in its place. For example if there is no state level data for a given dataset, but there is country level data and regional data (i.e., New England, Midwest, etc.) then applicable data may be substituted from this larger geographic area for the missing local information.

Figure 7B:
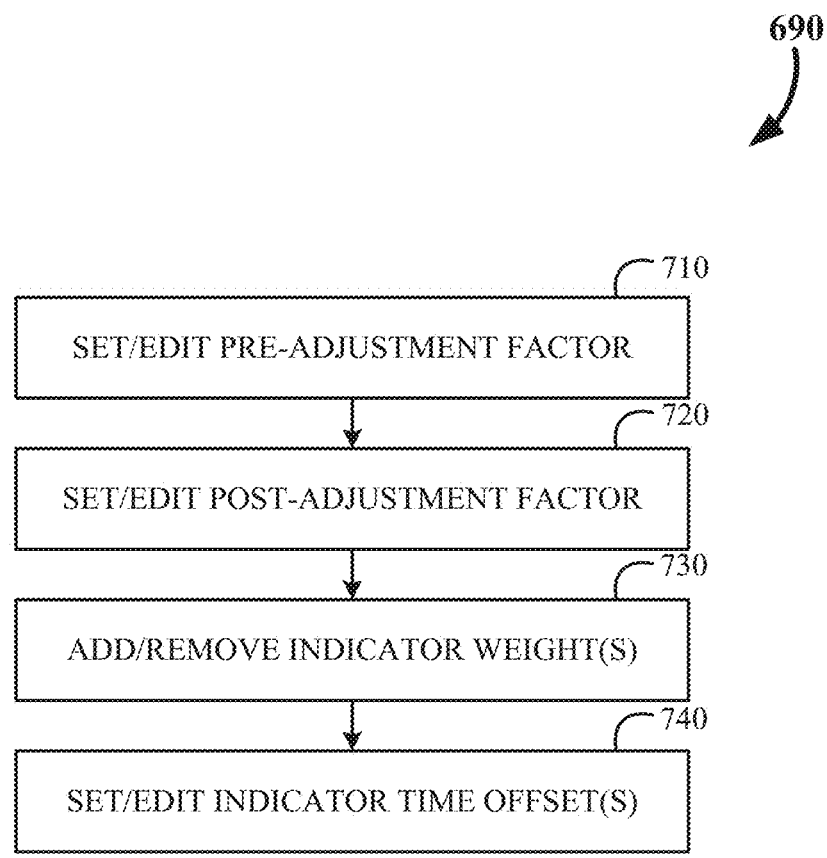
FIG. 7B is a flow chart diagram of model editing, in accordance with some embodiments.

Returning to FIG. 6, the number of total datasets is then permutated into combinations and run in parallel modelling processes (at 640). This parallel modeling results in a number of output model results, which are then compared against past actuals to calculate the weighted predictive R-squared values for each model (at 650). The model with the highest R-squared score is then selected (at 660) and used for viewing (670) and additional analytics such as backtesting (at 680) and editing (at 690). Editing, as seen in greater detail in relation to FIG. 7B, may include editing pre-adjustment factors (at 710), post adjustment factors (at 720) indicator weights (at 730) and/or indicator time offsets (at 740). Pre-adjustment factors and post-adjustment factors are multipliers to the forecast and/or indicators that account for some anomaly in the data. For example, a major snowstorm impacting the eastern seaboard may have an exaggerated impact upon heating costs in the region. If the forecast is for global demand for heating oil, this unusual event may skew the final forecast. An adjustment factor may be leveraged in order to correct for such events. The weight may be any positive or negative number, and is a multiplier against the indicator to vary the influence of the indicator in the final model. A negative weight will reverse procyclic and countercyclic indicators. Determining whether an indicator relationship exists between two data series, as well as the nature and characteristics of such a relationship, if found, can be a very valuable tool. Armed with the knowledge, for example, that certain macroeconomic metrics are predictors of future internal metrics, business leaders can adjust internal processes and goals to increase productivity, profitability, and predictability. The time offset allows the user to move the time domain of any indicator relevant to the forecast. For example, in the above example of global heating oil, the global temperature may have a thirty day lag in reflecting in heating oil prices. In contrast, refining capacity versus crude supply may be a leading indicator of the heating oil prices. These two example indicators would be given different time offsets in order to refine the forecast.

For any forecast indicator, an $R^2$ value, procyclic value and countercyclic value is generated in real time for any given weight and time offset. These statistical measures enable the user to tailor their model according to their concerns. In some embodiments the weights and offsets for the indicators may be auto-populated by the method with suggested values.

Modeling formulas may be configured using machine learning, or expert input. These models may be leveraged by a typical user without any additional interaction. However for a more advanced user, it may be desirable to allow editing of model formulas. In some embodiments, the formula is freeform, allowing the user to tailor the formula however desired. In alternate embodiments, the formula configuration includes a set of discrete transformations, including providing each indicator with a weight, and allowing the indicators to be added/subtracted and/or multiplied or divided against any other single or group of indicators.

Figure 13:
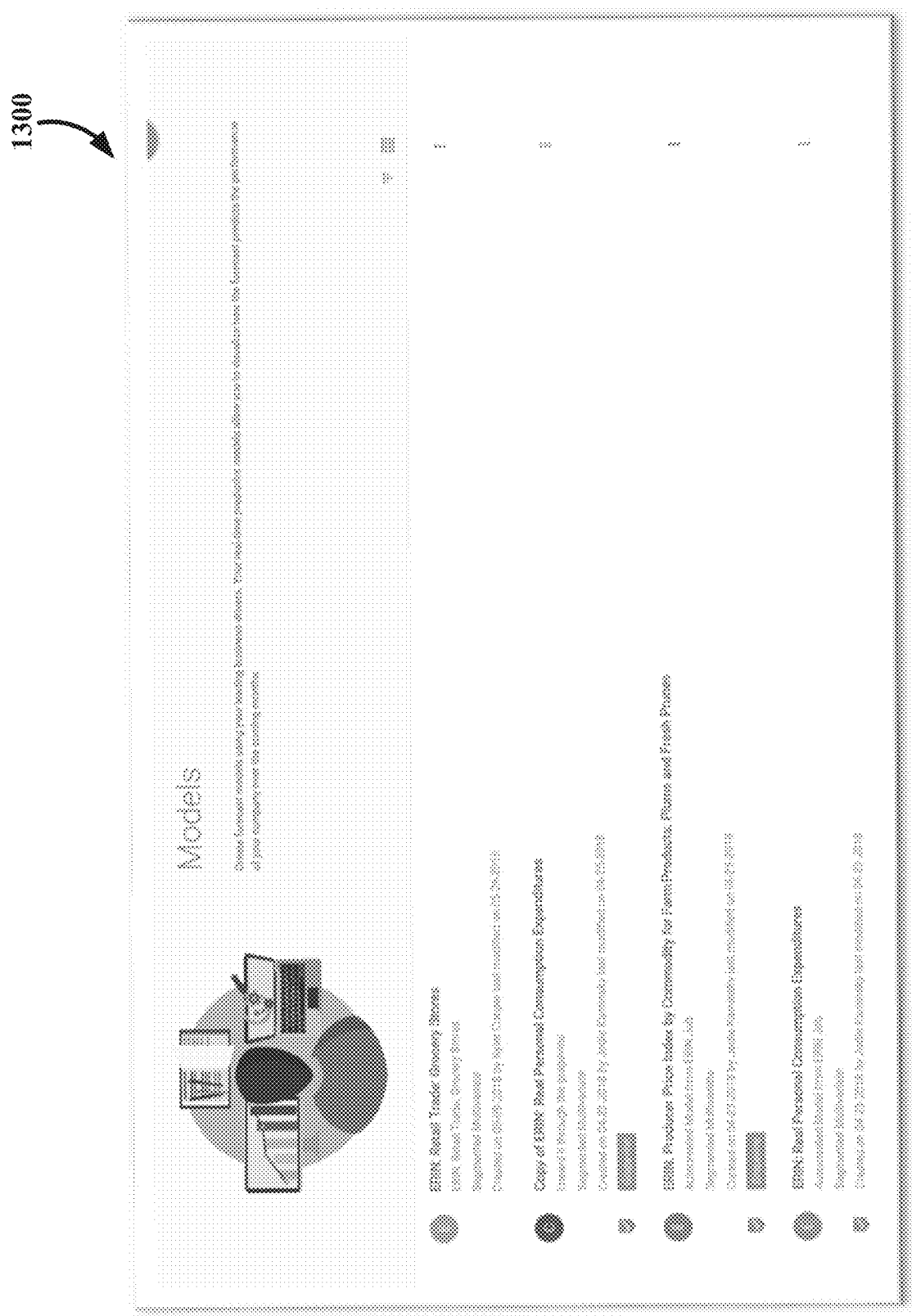
FIG. 13 is an example screenshot illustrating modeling dashboard, in accordance with some embodiments.

FIG. 13 provides an example screenshot of a model dashboard 1300 where the models associated with a project are provided to the user. Here the user is able to edit, delete, copy or create additional models. Models may also be opened for viewing, tagged for searching, moved to other projects and associated with specific reports.

Figure 14:
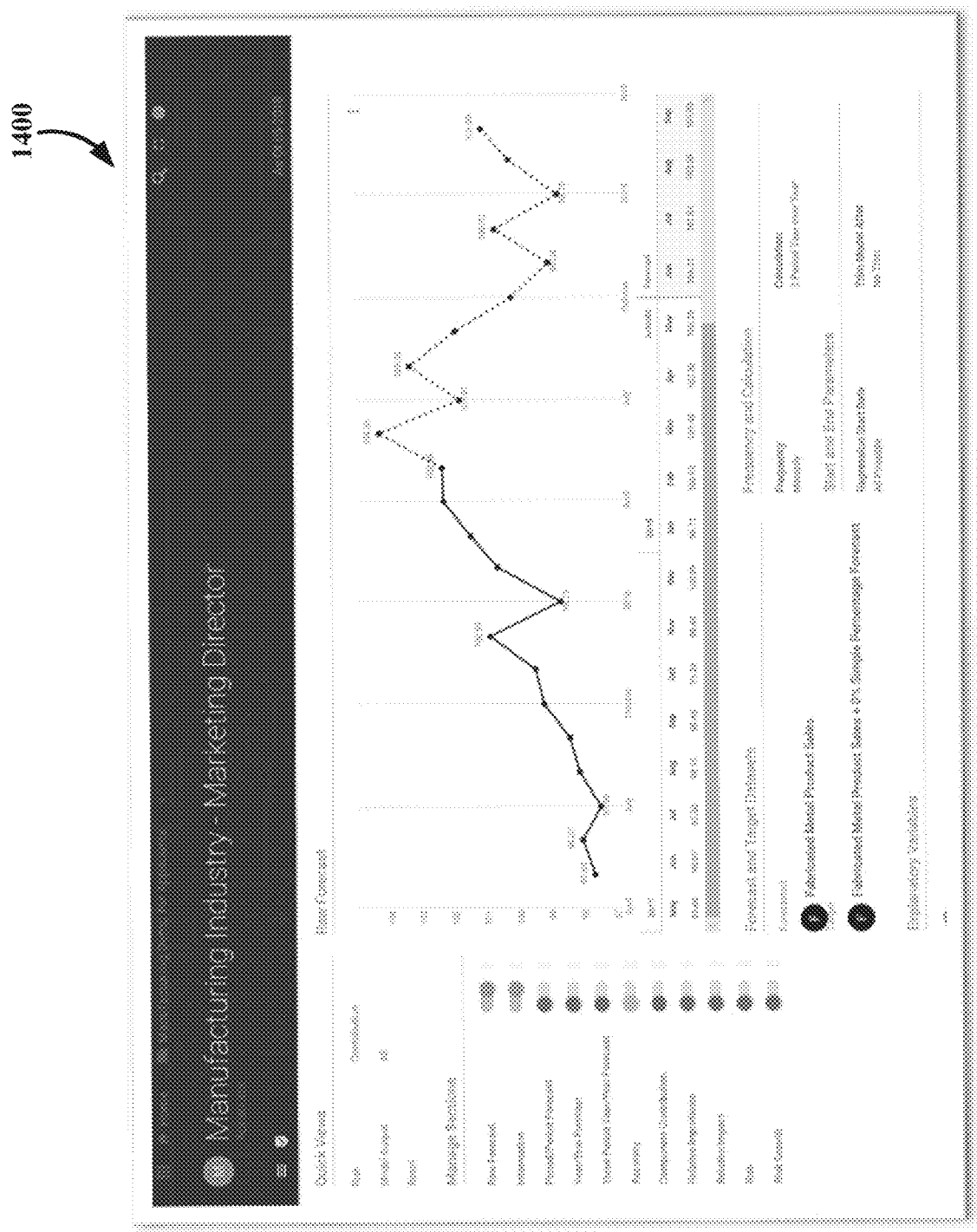
FIG. 14 is an example screenshot illustrating an example model, in accordance with some embodiments.

When a model is opened, a dashboard 1400 is presented to the user for the specific model, as seen in the example illustration of FIG. 14. The most relevant information to the model is provided to the user in this example, and specific data may be toggled as being visible or not. For instance, in this example screenshot, the raw forecast is set as being visible, which is presented as a graph with a solid line for past forecast, and a dotted line for future forecast. Information, such as what is being forecasted, target datasets and key parameters, are also displayed. Significant amounts of additional data may be selected for display in the model, but is not present in this example, such as accuracy measures, risk, relative importance of indicators, etc. In some embodiments, any individual with project permissions may access and view the model.

Figure 15:
FIGS. 15-18 are example screenshots illustrating model analytics, in accordance with some embodiments.

In FIG. 15, another example screenshot of the model dashboard 1500 is seen. In this example, the only difference us that accuracy data has been selected as being visible. In the top graph, the as-of date has been shifted one year back, and the actual line (lighter dotted line) is shown in comparison to the forecasted line (darker dotted line). Note, the initial values are very close to one another, but the further into the future, the larger the discrepancy between the actual values and forecasted values become. Below the plot, the single period error is provided in histogram format. Likewise, aggregate error is provided in a separate histogram.

Figure 8:
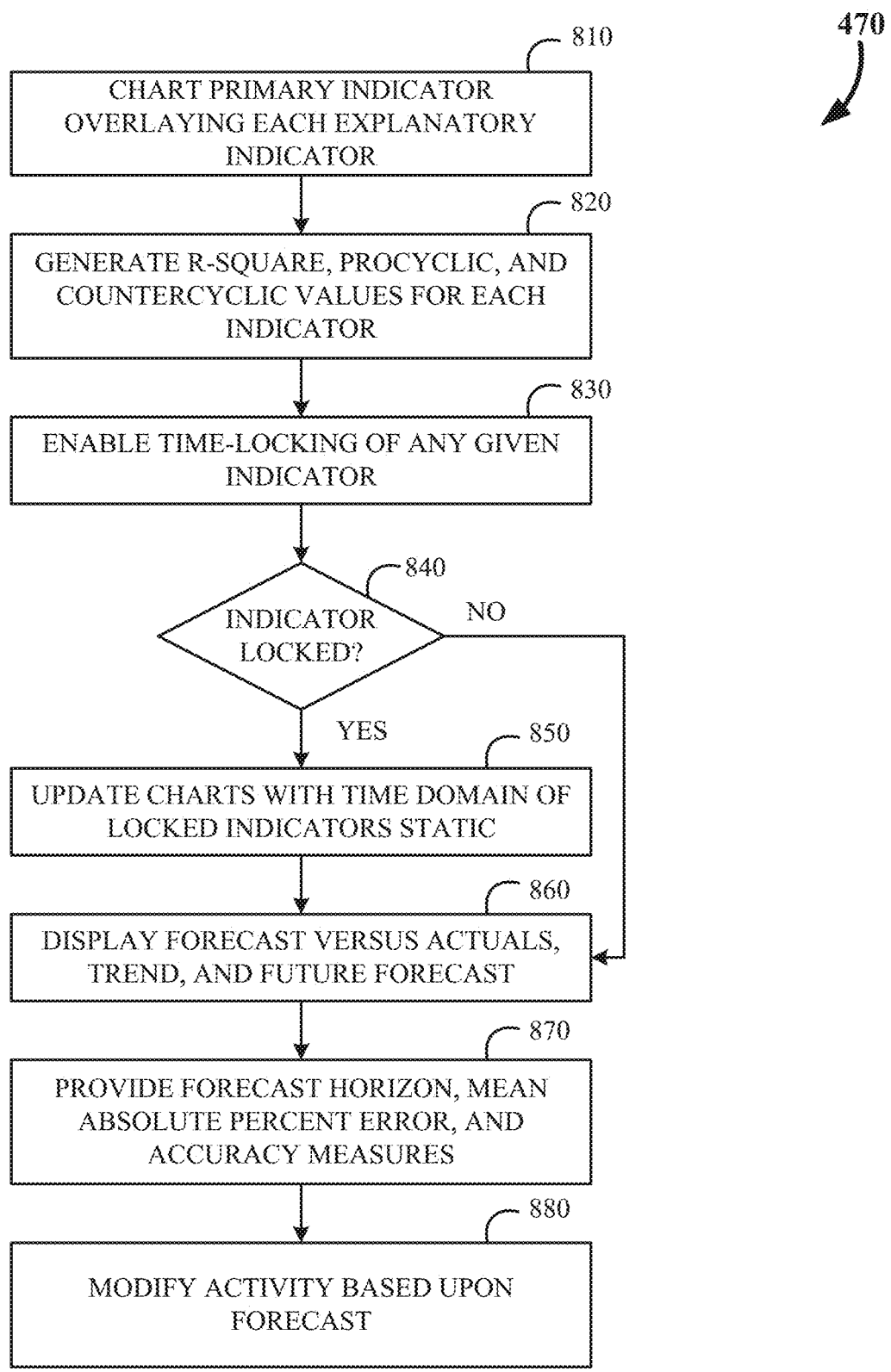
FIG. 8 is a flow chart diagram of report generation, in accordance with some embodiments.

Returning to FIG. 4, after model management, reports may be generated (at 470) using the various models and these models may be published (at 480). Report generation includes compiling desired model metrics together. Report generation may additionally include analysis of the models. For example, FIG. 8 provides a more detailed flowchart for the process of analyzing a model forecast. Initially the primary indicator is charted overlying each explanatory indicator (at 810). This charting allows a user to rapidly ascertain, using visual cues, the relationship between the primary indicator and each given metric. Humans are very visual, and being able to graphically identify trends is often much easier than using numerical data sets. In addition to the graphs, the R2, procyclic values, and countercyclic values may be presented (at 820) alongside the charted indicators.

Where the current method is particularly potent is its ability to rapidly shift the time domains, on the fly, of any of the indicators to determine the impact this has on the forecast. In some embodiments, one or more time domain adjusters may be utilized to alter the time domain of indicators, and alter and redefine the time domain in which the selected metrics for a report are displayed. Additionally, the time domain of any given indicator may be locked (at 830) such that if an indicator is locked (at 840) any changes to the time domain will only shift for non-locked indicators. Upon a shift in the time domain, the charts that are locked are kept static (at 850) as the other graphs are updated.

In addition to presenting the graphs comparing indicators to the forecast, in some embodiments, the forecast may be displayed versus actual values (for the past time period), trends for the forecast are likewise displayed, as well as the future forecast values (at 860). Forecast horizon, mean absolute percent error, and additional statistical accuracy measures for the forecast may also be provided (at 870). Lastly, the eventual purpose of the generation of the forecast is to modify user or organization behaviors (at 880).

In some embodiments, modifying behaviors may be dependent upon the user to formulate and implement. In advanced embodiments, suggested behaviors based upon the outlook scores (such as commodity hedging, investment trends, or securing longer or shorter term contracts) may be automatically suggested to the user for implementation. In these embodiments, the system utilizes rules regarding the user, or organization, related to objectives or business goals. These rules/objectives are cross referenced against the outlook scores, and advanced machine learning algorithms may be employed in order to generate the resulting behavior modification suggestions. In some other embodiments, the user may configure state machines in order to leverage outlook scores to generate these behavior modification suggestions. Lastly, in even further advanced embodiments, in addition to the generation of these suggestions, the system may be further capable of acting upon the suggestions autonomously. In some of these embodiments, the user may configure a set of rules under which the system is capable of autonomous activity. For example, the outlook score may be required to have above a specific accuracy threshold, and the action may be limited to a specific dollar amount for example.

Figure 16:
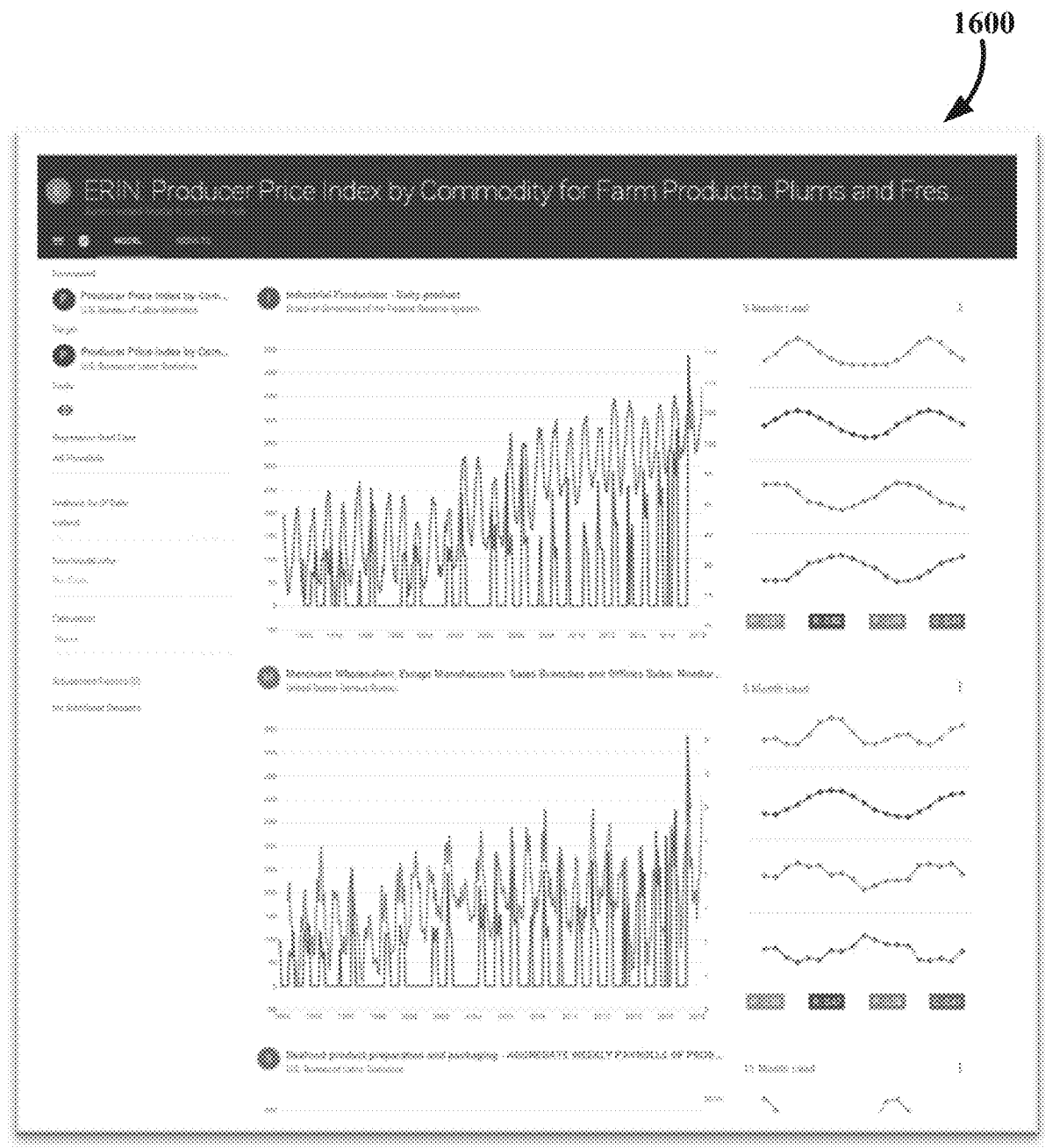
Figure 17:
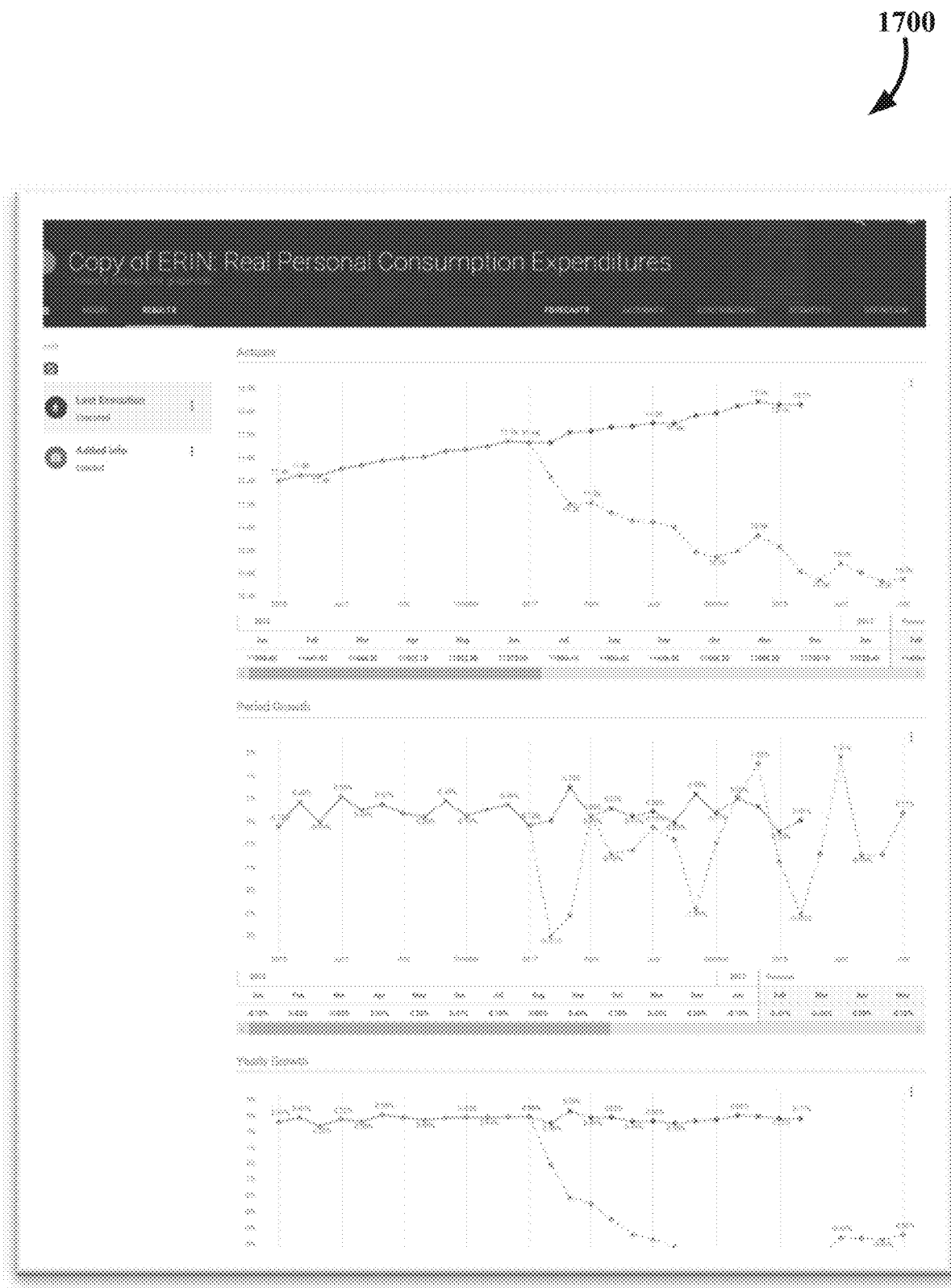

Turning to FIG. 16, an example screenshot 1600 of an edited model for inclusion in a report is provided. The left sidebar allows the viewer to edit and interact with the report. "Snapshots" of specific information, such as accuracy reports, may be saved by the user and included in the report. FIG. 17 is an example screenshot 1700 of such a 'snapshot'. Snapshots also allow for on-the-fly alternative testing of a model without the need to copy the entire model. Model editing is restricted to individuals with appropriate access, but allows for the production of report features that can be disseminated more broadly.

Figure 18:
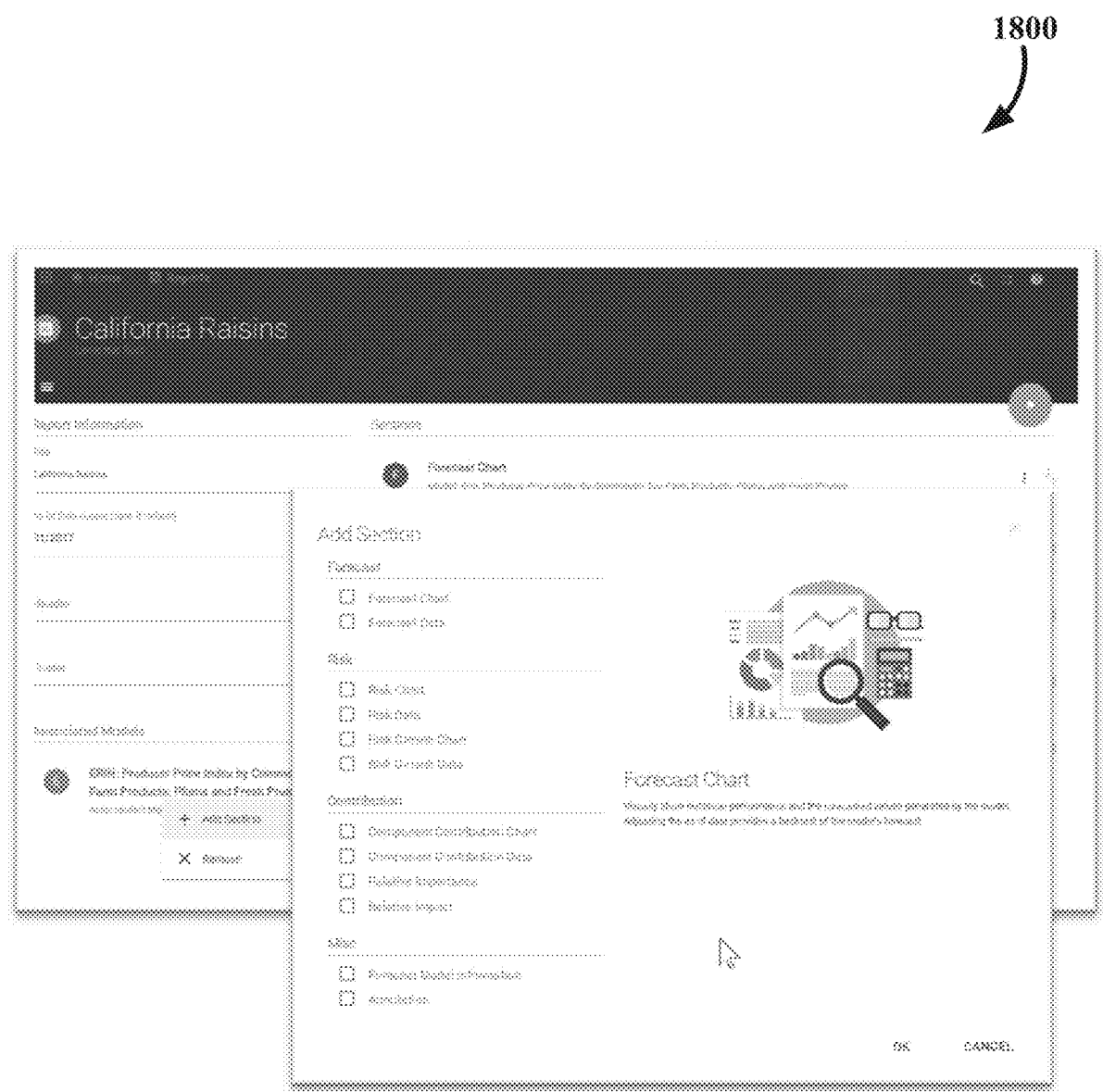

FIG. 18 provides an example screenshot of a report 1800, which is fully defined by the user. Components from model view screens may be incorporated into the reports. Templates for reports may be accessed by the user to help assist in the generation of aesthetically pleasing and informative reports.

III. System Embodiments

Figure 19A:
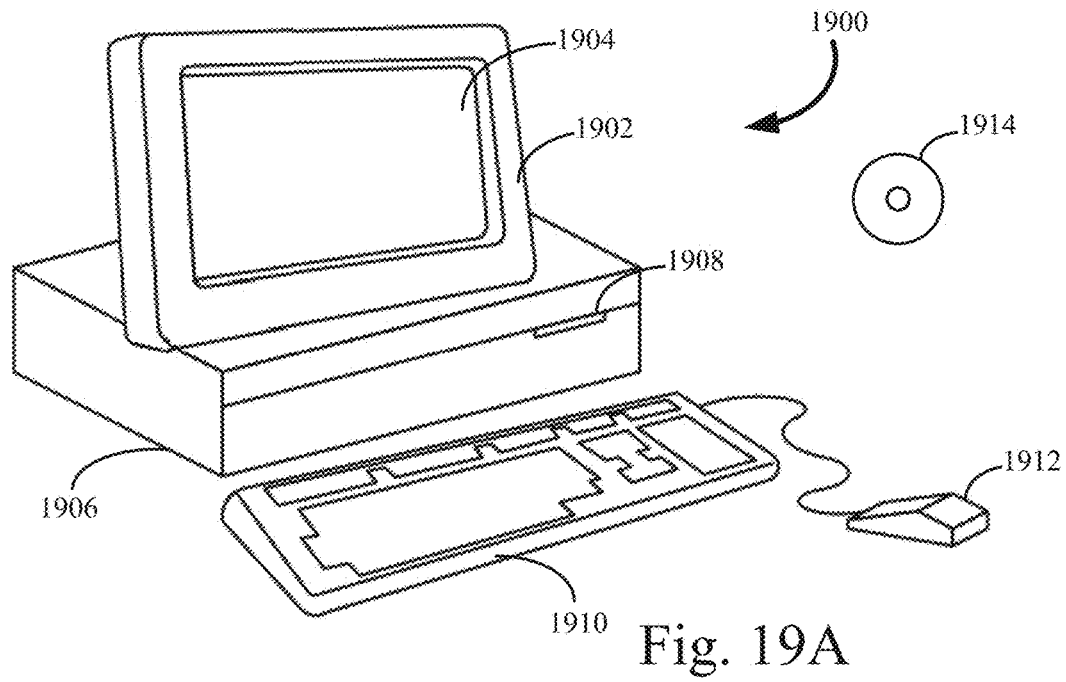
FIGS. 19A and 19B illustrate exemplary computer systems capable of implementing embodiments of the data management and forecasting system.
Figure 19B:
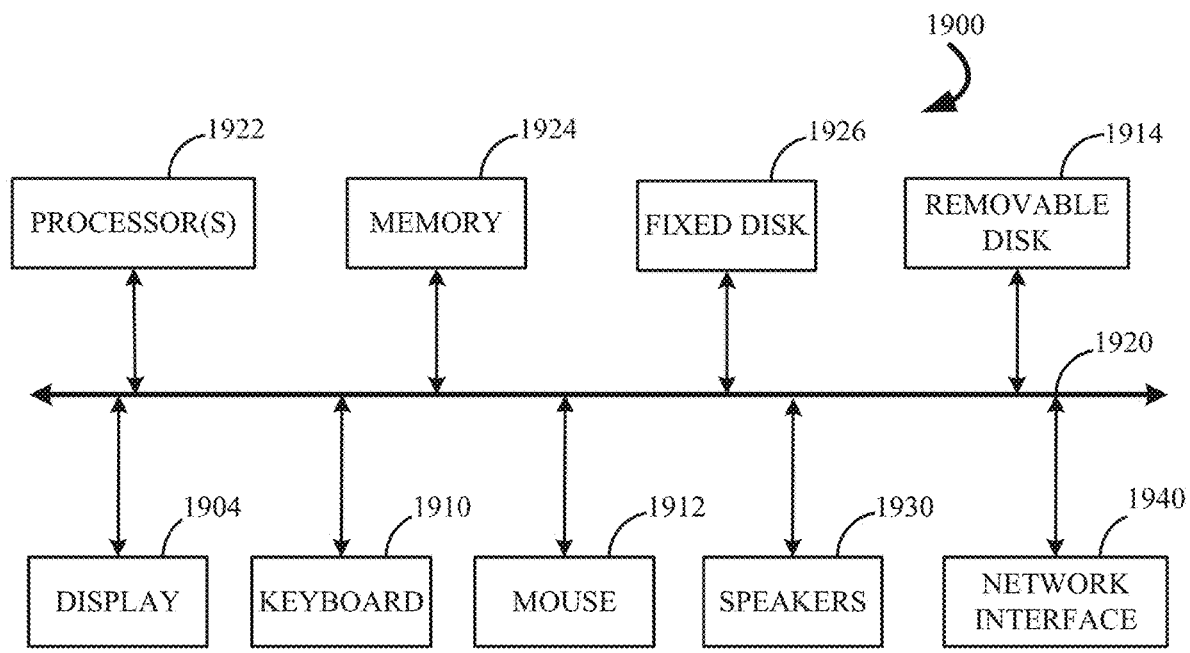

Now that the systems and methods for the generation of models and management of these models and data have been described, attention shall now be focused upon systems capable of executing the above functions. To facilitate this discussion, FIGS. 19A and 19B illustrate a Computer System 1900, which is suitable for implementing embodiments of the present invention. FIG. 19A shows one possible physical form of the Computer System 1900. Of course, the Computer System 1900 may have many physical forms ranging from a printed circuit board, an integrated circuit, and a small handheld device up to a huge super computer. Computer system 1900 may include a Monitor 1902, a Display 1904, a Housing 1906, a Disk Drive 1908, a Keyboard 1910, and a Mouse 1912. Disk 1914 is a computer-readable medium used to transfer data to and from Computer System 1900.

FIG. 19B is an example of a block diagram for Computer System 1900. Attached to System Bus 1920 are a wide variety of subsystems. Processor(s) 1922 (also referred to as central processing units, or CPUs) are coupled to storage devices, including Memory 1924. Memory 1924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed medium 1926 may also be coupled bi-directionally to the Processor 1922; it provides additional data storage capacity and may also include any of the computer-readable media described below. Fixed medium 1926 may be used to store programs, data, and the like and is typically a secondary storage medium (such as a hard disk) that is slower than primary storage. It will be appreciated that the information retained within Fixed medium 1926 may, in appropriate cases, be incorporated in standard fashion as virtual memory in Memory 1924. Removable Disk 1914 may take the form of any of the computer-readable media described below.

Processor 1922 is also coupled to a variety of input/output devices, such as Display 1904, Keyboard 1910, Mouse 1912 and Speakers 1930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1922 optionally may be coupled to another computer or telecommunications network using Network Interface 1940. With such a Network Interface 1940, it is contemplated that the Processor 1922 might receive information from the network, or might output information to the network in the course of performing the above-described generation of models. Furthermore, method embodiments of the present invention may execute solely upon Processor 1922 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 1900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for generating a model, useful in association with a business analytics system, the method comprising:
   selecting a plurality of indicators relevant to a model;
   generating a strength score for each of the plurality of indicators using a processor that calculates a R-squared value and procyclic values for each indicator to derive the strength scores by adding the R-squared value and procyclic values and multiplying the results by a seasonality determination, a normalized fraction of a number of model indicators over a total number of models, a normalized difference in a last update, a normalized difference between a minor outlier count and a major outlier count, and a fraction of data overlap over a frequency value of the indicator;
   ranking the plurality of indicators by their strength score;
   bucketizing the plurality of ranked indicators;
   configuring a plurality of models using machine learning;
   modeling various permutations of the bucketized indicators in parallel to generate a plurality of model forecasts;
   selecting one of the plurality of model forecasts with the highest accuracy; and
   generating a report using the selected one model forecast.

2. The method of claim 1, wherein the strength score is calculated by:

$$(\text{R-squared calculation} + \text{procyclic calculation}) \times (\text{the seasonality determination}) \times ((\text{the number of models the indicator is included}/\text{the total number of models}) + 1) \times (1 - ((\text{Difference in the last updated} - 2)/20))) \times (1 - (\text{minor outlier count}/100) - (\text{major outlier count}/20)) \times (\text{data overlap}/\text{frequency value of the indicator}) \times 100,$$

wherein the seasonality determination is 0.95 for a seasonality indicator and 1.05 for a non-seasonality indicator, and wherein the frequency value of the indicator is 54 for monthly, 18 for quarterly, 9 for semiannually, and 5 for annually.

3. The method of claim 1, wherein the bucketizing includes dividing the total number of data points available for the model by five and multiplying by four buckets to generate a total number of data sets.

4. The method of claim 3, wherein the total number of data sets are divided evenly into a macroeconomic bucket, a target industry bucket, a demand industry bucket and a miscellaneous bucket.

5. The method of claim 4, wherein the data sets in the macroeconomic bucket are national level, and the datasets in the target industry bucket, the demand industry bucket and the miscellaneous bucket are equal parts national level and local level datasets, when appropriate.

6. The method of claim 5, wherein higher level datasets are substituted when local level datasets are unavailable.

7. The method of claim 4, wherein the datasets are divided into the four buckets by tag information and the strength scores.

8. The method of claim 1, wherein the report generating includes backtesting the model.

9. The method of claim 1, wherein report generating includes calculating a single period error rate and an aggregate period error for the model.

10. The system of claim 1, wherein report generating includes calculating a single period error rate and an aggregate period error for the model.

11. A computerized system for generating a model comprising:
- a data aggregation server for selecting a plurality of indicators relevant to a model;
- a data analyzer for generating a strength score for each of the plurality of indicators using a processor that calculates a R-squared value and procyclic values for each indicator to derive the strength scores by adding the R-squared value and procyclic values and multiplying the results by a seasonality determination, a normalized fraction of a number of model indicators over a total number of models, a normalized difference in a last update, a normalized difference between a minor outlier count and a major outlier count, and a fraction of data overlap over a frequency value of the indicator;
- a modeling engine for configuring a plurality of models using machine learning, modeling various permutations of the bucketized indicators in parallel to generate a plurality of model forecasts, and selecting one of the plurality of model forecasts with the highest accuracy; and
- a reporting module for generating a report using the selected one model forecast.

12. The system of claim 11, wherein the strength score is calculated by:

$$(\text{R-squared calculation} + \text{procyclic calculation}) \times (\text{the seasonality determination}) \times ((\text{the number of models the indicator is included}/\text{the total number of models})+1) \times (1-((\text{difference in last updated}-2)/20)) \times (1-(\text{minor outlier count}/100)-(\text{major outlier count}/20)) \times (\text{data overlap}/\text{frequency value of the indicator}) \times 100,$$

wherein the seasonality determination is 0.95 for a seasonality indicator and 1.05 for a non-seasonality indicator, and wherein the frequency value of the indicator is 54 for monthly, 18 for quarterly, 9 for semiannually, and 5 for annually.

13. The system of claim 11, wherein the bucketizing includes dividing the total number of data points available for the model by five and multiplying by four buckets to generate a total number of data sets.

14. The system of claim 13, wherein the total number of data sets are divided evenly into a macroeconomic bucket, a target industry bucket, a demand industry bucket and a miscellaneous bucket.

15. The system of claim 14, wherein the data sets in the macroeconomic bucket are national level, and the datasets in the target industry bucket, the demand industry bucket and the miscellaneous bucket are equal parts national level and local level datasets, when appropriate.

16. The system of claim 15, wherein higher level datasets are substituted when local level datasets are unavailable.

17. The system of claim 14, wherein the datasets are divided into the four buckets by tag information and the strength scores.

18. The system of claim 11, wherein the report generating includes backtesting the model.

* * * * *